(12) United States Patent
Featonby et al.

(10) Patent No.: US 10,697,905 B2
(45) Date of Patent: Jun. 30, 2020

(54) APPARATUS AND METHOD FOR SCANNING A STRUCTURE

(71) Applicant: JOHNSON MATTHEY PUBLIC LIMITED COMPANY, London (GB)

(72) Inventors: Paul David Featonby, Billingham (GB); Owen John Lloyd Jones, Billingham (GB); Francis O'Doherty, Billingham (GB); Emanuele Ronchi, Billingham (GB); John Somerton, Billingham (GB)

(73) Assignee: Johnson Matthey Public Limited Company, London (GB)

( * ) Notice: Subject to any disclaimer, the term of this patent is extended or adjusted under 35 U.S.C. 154(b) by 331 days.

(21) Appl. No.: 15/558,377

(22) PCT Filed: Mar. 17, 2016

(86) PCT No.: PCT/GB2016/050746
§ 371 (c)(1),
(2) Date: Sep. 14, 2017

(87) PCT Pub. No.: WO2016/147006
PCT Pub. Date: Sep. 22, 2016

(65) Prior Publication Data
US 2018/0100816 A1     Apr. 12, 2018

(30) Foreign Application Priority Data
Mar. 17, 2015   (GB) .................................. 1504471.2

(51) Int. Cl.
*G01N 23/20066*  (2018.01)
*G01N 23/18*  (2018.01)
*G01T 1/178*  (2006.01)

(52) U.S. Cl.
CPC ....... *G01N 23/20066* (2013.01); *G01N 23/18* (2013.01); *G01T 1/178* (2013.01); *G01N 2223/1013* (2013.01)

(58) Field of Classification Search
CPC ..... G01N 23/20066; G01N 2223/1013; G01N 23/18; G01T 1/178
See application file for complete search history.

(56) References Cited

U.S. PATENT DOCUMENTS

| 4,190,772 A | 2/1980 | Dinwiddie et al. |
| 4,651,005 A | 3/1987 | Baba et al. |

(Continued)

FOREIGN PATENT DOCUMENTS

| EP | 0217706 A2 | 4/1987 |
| GB | 2157930 A | 10/1985 |

(Continued)

OTHER PUBLICATIONS

GB1504471.2, Search Report Under Section 17(5) dated Aug. 12, 2015.

(Continued)

*Primary Examiner* — Michael C Bryant
(74) *Attorney, Agent, or Firm* — BakerHostetler

(57) ABSTRACT

A subsea apparatus and method for scanning a subsea structure to detect differences in density between different parts of the subsea structure is described. A source of gamma radiation and a plurality of detectors arranged to detect gamma radiation emitted by the source are provided. The subsea structure is positioned between the source and the detectors, and the detectors and the source rotated in a fixed relationship to each other about an axis of rotation located between the detectors and the source. The plurality of detectors are arranged in a linear array, the linear array being (Continued)

substantially parallel to the axis of rotation. A pixelated detector array and a source container are also disclosed.

18 Claims, 16 Drawing Sheets

(56) References Cited

U.S. PATENT DOCUMENTS

| | | | |
|---|---|---|---|
| 4,725,963 A | | 2/1988 | Taylor et al. |
| 4,947,323 A * | | 8/1990 | Smith ............... G01N 23/18 382/132 |
| 5,614,720 A * | | 3/1997 | Morgan ............. G01N 23/18 250/358.1 |
| 6,925,145 B2 * | | 8/2005 | Batzinger ........... G01N 23/04 378/4 |
| 6,935,354 B2 * | | 8/2005 | Tom ................. F16K 1/303 137/1 |
| 7,329,875 B2 * | | 2/2008 | McEvoy ............. G01T 1/20 250/367 |
| 7,656,997 B1 | | 2/2010 | Anjelly |
| 9,897,558 B2 * | | 2/2018 | Bowdon ............. G01V 5/005 |
| 2006/0078091 A1 | | 4/2006 | Lasiuk et al. |
| 2012/0275566 A1 | | 11/2012 | Hunter et al. |
| 2015/0241572 A1 * | | 8/2015 | Bowdon ............. G01N 9/24 378/64 |
| 2017/0045465 A1 * | | 2/2017 | Featonby ........... G01N 23/18 |

FOREIGN PATENT DOCUMENTS

| | | |
|---|---|---|
| GB | 2211708 A | 7/1989 |
| GB | 2496736 A | 5/2013 |
| WO | WO2014086837 A1 | 6/2014 |

OTHER PUBLICATIONS

PCT/GB2016/050746, International Search Report dated Aug. 16, 2016.
Benson et al: "Non-intrusive Pipeline Inspection Techniques for Accurate Measurement of Hydrates and Waxes within Operational Pipelines", Offshore Europe, Jan. 1, 2007, XP055634736.
Chatzakos P et al: "On the development of an unmanned underwater robotic crawler for operation on subsea flexible risers", Robotics Automation and Mechatronics (RAM), 2010 IEEE Conference on, IEEE, Piscataway, NJ, USA, Jun. 28, 2010, pp. 419-424, XP031710209.
McNab et al: "Computed radiography deployed by a subsea remotely operated vehicle", Insight—Non-Destructive Testing and Condition Monitoring, vol. 50, No. 3, Mar. 1, 2008, pp. 138-145, XP055619138.
Tortora et al, "Quantitative measurement of solids distribution in gas-solid riser flows using electrical impedance tomography and gamma densitometry tomography" International Journal of Multiphase Flow, Elsevier, Amsterdam, NL, vol. 32 No. 8, Aug. 1, 2006, pp. 972-995, XP027881785.
Toskey et al: "OTC 23317 Improvements to Deepwater Subsea Measurements RPSEA Program: ROV-Assisted Measurement", Apr. 30, 2012, XP055634839.

* cited by examiner

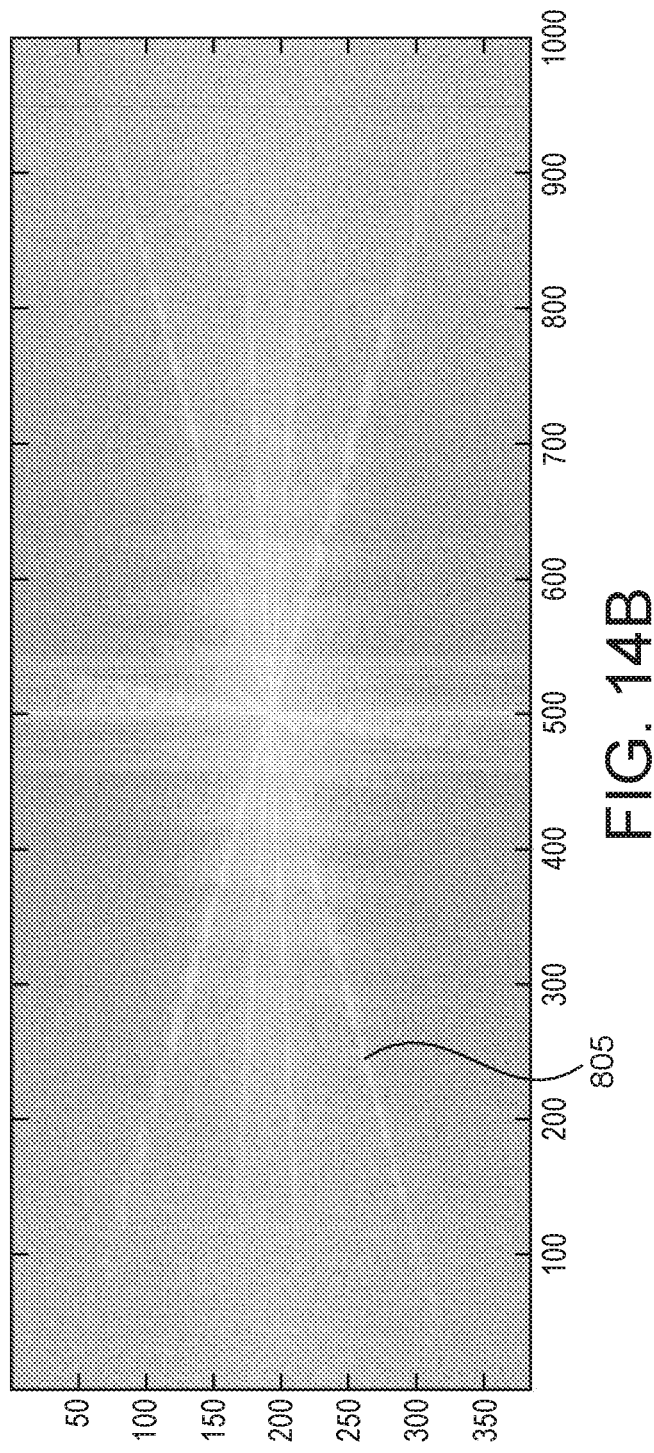

APPARATUS AND METHOD FOR SCANNING A STRUCTURE

CROSS-REFERENCE TO RELATED APPLICATIONS

This application is a National Stage of International Patent Application No. PCT/GB2016/050746 filed Mar. 17, 2016, which claims the benefit of Great Britain Patent Application No. 1504471.2 filed Mar. 17, 2015, the disclosures of each of which are incorporated herein by reference in their entirety.

FIELD OF THE INVENTION

The present invention relates to an apparatus and method for scanning a structure, and relates particularly, but not exclusively, to an apparatus, and method for scanning a structure using gamma radiation to detect differences in density between different parts of the structure. The apparatus and method of the invention have particular benefits for use in an undersea pipeline inspection apparatus. The present invention also relates to a pixelated detector array and a source container useful in methods and apparatus for scanning a structure.

BACKGROUND

It is known to use gamma radiation for scanning structures, for example to obtain information about the density within the structure or to identify flaws such as cracks or corrosion in the structure. This is particularly useful for inspecting pipes subsea, where it is not always possible to inspect the pipe from the interior. Gamma scanning is also used for obtaining information about other industrial structures such as distillation columns and the like.

An apparatus for scanning structures such as a pipeline or process vessel using gamma radiation is described in GB 2496736 A. This apparatus comprises a source of gamma radiation and an array of detectors spaced apart circumferentially. The apparatus is capable of being arranged with the structure to be scanned, such as a pipeline, positioned between the source and detectors so that radiation emitted by the source can pass along the plurality of paths through a portion of the structure to the detectors. The number of detectors in the array may range from fewer than 10 up to more than 100, e.g. up to 150, depending on the application. Counting the number of gamma photons transmitted from the source to the detectors, through the structure being scanned, enables differences in the density of different parts of the structure to be detected.

To obtain high resolution data, a large number of detectors are used, closely spaced from one another. The detectors are arranged in an arc centred on the structure to be scanned. In operation, the source and array of detectors are arranged in fixed relationship with respect to each other, and are rotated around the structure to be scanned. In this way, information about the density of the structure along a plurality of paths is obtained, enabling a high resolution density tomogram of the structure to be calculated. The apparatus may also be translated axially to scan different sections of the structure. The device can produce accurate, high resolution data, but the data may be slow to acquire. A typical scan at a single axial location, covering perhaps a few mm of axial length of the structure, may take several minutes to complete. There remains a need for a technique that can scan pipes more quickly.

In subsea applications, additional constraints arise. When operating at a depth of 1000 metres underwater, the pressure is 100 atmospheres and increases by a further 100 atmospheres for each additional 1000 metres of depth. The apparatus must be able to withstand this pressure yet remain sufficiently compact for deployment using remotely operated vehicles capable of operating at the required depth.

A typical detector for detecting gamma radiation comprises a scintillating crystal. Gamma rays entering the scintillation crystal interact with the scintillating material to produce photons in the visible and/or ultraviolet region. These scintillation photons are detected using a photodetector, for example a photomultiplier tube, which outputs an electrical pulse providing information about the number and energy of the incident gamma photons.

Some prior art scanning techniques, particularly in medical applications, use pixelated x-ray detectors. Such detectors may feature a scintillating layer converting x-ray radiation into light and a photodiode array transforming light intensity into electrical current. The radiographic image may then by compiled by integrating current over a certain period of time for each pixel in the array and then digitizing the results via analogue to digital converters. Such detectors may have limitations in that they are typically designed for use with electrical x-ray generators that emit a broad energy spectrum peaking at 80-160 keV in many cases. Use of such detectors with high-energy gamma radiation sources is often discouraged as the scintillating layer in the panel does not stop a significant portion of the incoming gamma flux. Such panels also use photodiodes to convert light into electrical current. That may provide good linearity, but can require a very large incoming photon flux, such as may be obtained with continuous x-ray illumination, in order to generate an electrical current above the thermal threshold (so called "dark current") at room temperature. However, they may not be so suitable for use with low count rates of gamma radiation. There is therefore a need for improved detectors for use in gamma radiation scanning.

Sources of gamma radiation must be transported safely. To achieve that, source containers for highly active sources must be certified, for example Type B (Type B(U) or Type B(M)) certified in accordance with The IAEA Regulations for the Safe Transport of Radioactive Material 2012 Edition Specific Safety Requirements No. SSR-6. Type B certified containers exist in the prior art, but may not be suitable for use at subsea locations.

Preferred embodiments of the present invention seek to overcome one or more of the above disadvantages of the prior art.

SUMMARY OF INVENTION

According to a first aspect of the invention, there is provided a method for scanning a subsea structure to detect differences in density between different parts of the subsea structure, the method comprising:
   providing a source of gamma radiation;
   providing a plurality of detectors arranged to detect gamma radiation emitted by the source;
   positioning the subsea structure between the source and the detectors; and
   rotating the detectors and the source in a fixed relationship to each other about an axis of rotation located between the detectors and the source;
   wherein the plurality of detectors are arranged in a linear array, the linear array being substantially parallel to the axis of rotation.

By providing a linear array of detectors, the linear array being substantially parallel to the axis of rotation, a significant axial length of the structure can be scanned in a single rotation. That may be at the expense of obtaining radially resolved data, which will typically require an arcuate array, but the present invention may provide data of sufficient quality for defects to be identified. The advantage of being able to scan a significant length of the structure may therefore outweigh the disadvantage of lack of radial resolution.

The axis of rotation is between the source and the detectors such that radiation emitted from the source passes substantially through the axis of rotation to the detectors. In some embodiments the source may comprise a source or a plurality of sources having a length in the direction of the axis of rotation substantially equal to the length of the linear array. However, preferably the source is a single, point source. That is, there is a single source having a dimension parallel to the axis of rotation that is preferably not more than 10%, more preferably not more than 1% and yet more preferably not more than 0.1% of the length of the linear array. Preferably the source is located such that radiation passing from the source to a detector at the centre of the linear array travels perpendicular to the axis of rotation. In that way the radiation beam fans out along the length of the linear array from a centrally located source. That may aid in determining the position of defects. Preferably the axis of rotation is located at a mid-point between the source and the detectors. In that way the radius of rotation of the source and the detectors is the same, which may advantageously minimise the total size of the apparatus.

Preferably, the method further comprises a step of recording data related to the count rate of gamma radiation detected by each detector at each of a plurality of angular positions. It will be understood that the count rate detected is related to the density of material between the source and the detector at the position at which the count rate is detected. The method may therefore include a step of analysing the data to detect differences in density between different parts of the structure. The analysis may take the form of identifying angular or axial regions of variation from the mean axial or angular count rate. For example, if the data is arranged in a matrix, with each row of data relating to the count rate from each of the detectors in the axially aligned linear array at a particular angular position of the source and the array of detectors, the analysis may involve identifying mean values for each of the rows and/or columns in the matrix and then identifying values that deviate significantly from those mean values.

The count rate may be determined at an angular position by rotating the source and the detectors to that angular position and holding them stationary there whilst recording the count rate over a period of time. However, the count rate is preferably determined at an angular position by continuously recording the count rate as the source and detectors rotate and assigning the count rate recorded over a small segment of angular rotation to an angular position characteristic of that segment. The small segment is preferably not more than 1 degree, more preferably not more than 0.5 degrees and yet more preferably not more than 0.25 degrees. In some embodiments the small segment may be not more than 0.1 degrees. Such a method may be referred to as "binning" the data into a plurality of bins, each bin representing a small segment of the total angular rotation of the device throughout the measurement and being identified by a characteristic angular position for that bin, for example the angular rotation at the start, end or centre of the bin. Binning data acquired during a continuous rotation may be advantageous because it avoids the need to start and stop the rotation of the device for every measurement, which may be time consuming and may place strain on motors and gears that drive the rotation.

The method may comprise recording data that satisfies a predetermined condition. For example, the condition may relate to the energy of the radiation detected. It will be appreciated that a detector may comprise a scintillator, which produces photons of light in response to the absorption of radiation, and a photodetector that receives the photons of light and generates electrical pulses in response. The height, for example the magnitude of the current or voltage, of the electrical pulse may correspond to the energy of the radiation received, but may also depend on the gain of the detector. The height of the pulses may be calibrated so as to provide accurate information about the absolute energy of the absorbed radiation. That may be done, for example, by identifying characteristic features, such as photopeaks, in the radiation received and relating those features to known energy values for the radiation source. The measured count rate may then be restricted to a certain part of the pulse height spectrum, for example a window centred on the photopeak. However, in some embodiments the count rate measured may be the total count rate across all pulse heights, or the count rate above a threshold pulse height. The threshold may, for example, be set based on a calibrated absolute energy, or may be set based on an analysis of electronic noise. For example, the count rate measured may be the count rate above a threshold, for example a threshold selected so as to exclude a region of the spectrum, typically at low pulse heights, where there is a large amount of electronic noise (for example where the spectrum is dominated by electronic noise). The measured count rate may therefore not be based on absolute energies. That is, the measured count rate may be based on criteria, for example a window or threshold, defined in terms of the pulse height, preferably without relating that pulse height to the absolute energy of the received radiation or characteristic features of the received radiation. That may be advantageous in that it removes a complex calibration step and permits the use of radiation sources that may have less well-defined photopeaks, but other desirable properties, for example in terms of the energy of the emitted radiation and the resulting attenuation rate. Because the invention is measuring relative densities of parts of the subsea structure, the absolute values of the radiation received by the detectors and the gain of the detectors may not be critical to the measurement. For example, the gain may remain sufficiently constant between measurements, and for measurements on different detectors, for reliable relative data to be obtained without calibration. Silicon photomultipliers may be particularly advantageous in such systems as we have found that silicon photomultipliers with similar characteristics can be selected so as to minimise variations in gain between different detectors. Analysing for deviations in a detector reading at a particular angular position from the mean count rate of that detector (that is, deviations within a column of the matrix described above) may also be particularly advantageous in such systems as the gain of an individual detector is unlikely to change much during a measurement cycle and deviations are therefore likely to be the result of variations in the density of the subsea structure.

Preferably the method comprises rotating the detectors and the source about an angle of 360 degrees or more. That may be advantageous in that each scan position is effectively repeated, but with the source and detectors in opposite locations, at angular positions separated by 180 degrees. A 360 degree scan therefore produces two measurements for each scan position. The method preferably includes the step of comparing the data from two scan positions separated by 180 degrees and inferring from the comparison the location, for example the angular location, of a defect. The step may infer the location in that the step determines on which side of the axis of rotation the defect lies. The step may use knowledge of the shape of the structure to infer a location of the defect, for example one or more of a radial, axial and angular location. By comparing the data from two scan positions, it may be determined where a defect lies in relation to the axis of rotation. When the source and detector are positioned such that the defect is on the same side of the axis of rotation as the source, the effect of the defect may be blurred in comparison to when the source and detector are positioned such that the defect is on the opposite side of the axis of rotation from the source. That is because radiation from the source is fanning out across the length of the linear array. The closer the defect is to the source, the more of the fan of radiation it affects. Thus the defect will appear more blurred when it is located on the same side of the axis of rotation as the source than when it is located on the opposite side of the axis of rotation to the source. By comparing the data when the source and detectors are rotated through an angle of 180 degrees, the radial location of the defect may be inferred. The size of the defect may also be more accurately determined using data from two angular positions separated by 180 degrees. Using data from two angular positions separated by 180 degrees to determine the size of a defect may allow the size of the defect to be corrected for the spreading effect described above. With a 180 degree scan it may only be possible to determine an approximate size. For example, the defect may be smaller and nearer the source, or larger and nearer the detector.

Preferably the structure is a subsea structure, for example a subsea pipeline. The method may be particular advantageous in subsea environments. For example, subsea applications may permit the use of radiation sources that permit improved scanning, but which would be difficult to use safely onshore. Moreover, gamma radiation may be advantageous in a subsea environment since gamma radiation source do not require power to produce radiation. It will be appreciated that providing large amounts of power may be challenging in a subsea environment due to the harshness of the conditions and the need for effective waterproofing of electrical components against the pressure of water in a subsea location.

Subsea locations may be locations at a depth of 100 m or greater, preferably 1000 m or greater, more preferably 3000 m or greater and yet more preferably 10,000 ft (3048 m) or greater. Subsea locations may be locations at a depth in the range of 100 m to 1000 m, preferably 100 m to 3000 m, more preferably 1000 m to 3000 m and yet more preferably 3000 ft to 10000 ft (914 m to 3048 m). It will be appreciated that apparatus and methods suitable for use in deep water, for example at depths of 3000 m, may be suitable for use in shallower water, for example at depths of less than 3000 m. That may be, for example, because the hydrostatic pressure decreases with decreasing depth. However apparatus and methods suitable for use in shallow water, for example at depths of 1 m, may not be suitable for use in deeper water, for example water deeper than 1 m.

The linear array may not provide highly radially resolved data since all the detectors in the array are located at the same circumferential angular location with respect to the source. However, the array may provide data allowing the axial and angular location of potential defects to be identified. The method may therefore further comprise a step of providing a second source of gamma radiation; providing a second plurality of detectors arranged to detect gamma radiation emitted by the second source; positioning a part of the structure identified as having a potential defect in the analysis of the data between the second source and the second detectors; and rotating the second detectors and the second source in a fixed relationship to each other about an axis of rotation located between the second detectors and the second source; wherein the second plurality of detectors are arranged in an arcuate array, the arcuate array being in a plane perpendicular to the axis of rotation. Preferably the second source and the second plurality of detectors are provided at a location of a defect identified in a first scan performed using the source and the linear array of detectors, for example a scan as described above. The second source and/or the second detectors may comprise collimators such that a plurality of linear radiation paths between each of the second detectors and the second source are defined by the collimators. The subsequent scanning of the structure using an arcuate array may permit radially resolved information, for example a density tomogram, to be provided about the defect identified in the scan using the linear array. It will be understood that, in order to produce highly resolved radial information it may be necessary to use narrow collimation both physically and in terms of the energy of the detected radiation. That may result in low count rates and slow scanning may be required in order to generate a satisfactory signal to noise ratio. By combining the two methods, the invention advantageously uses a rapid scanning method to identify potential defects and then uses a slower, radially resolved method to generate detailed information about those defects where that is required. Thus the invention may result in a more efficient scanning of lengthy structures. The combination may be particularly advantageous subsea, where the extra efficiency is particularly valuable in view of the challenges and cost of working subsea. The method involving the arcuate array may be carried out using an apparatus as described, for example, in GB 2496736 A.

The method may be particularly advantageous in the scanning of subsea pipelines. It will be appreciated that subsea pipelines may be long structures, and that their integrity may be important to safe and environmentally responsible operation of subsea installations, but that the inspection of that integrity may be difficult to perform. The ability of the method of the invention to non-intrusively and efficiently scan significant lengths of pipeline may therefore be particularly advantageous. The subsea pipeline may be a subsea riser. The method may also find utility in the scanning of subsea pipelines for flow assurance purposes. For example, the method may be used to detect a density difference in different parts of the structure and to relate that density difference to an aspect, for example a blockage, of the contents of the structure. Thus the structure may be a pipeline and the method may comprise the step of detecting a density difference between two parts of the pipeline and inferring a difference in the contents of the pipeline from the difference in density.

The walls of flexible risers consist of several layers, some of which are made out of strands of metal under tension. An example of a flexible riser is shown in FIG. 13. The method may comprise scanning a flexible riser. In the scan results, the strands of the riser preferably appear as diagonal lines. The diagonal lines in the results corresponding to the strands in the riser may have different inclinations depending on whether the strands are on the side of the riser nearest the source or the side of the riser nearest the detector. Preferably the method comprises obtaining the scan results, for example as a radiographic image, performing a Fourier transform of the scan results to create transformed results, and filtering the transformed results, for example to selectively emphasise features of the scan results that have a particular inclination. The filtered, transformed results are then reverse-transformed to create filtered scan results. It may be that the filtering is performed so as to emphasise the features of the scan results created by strands on only one side of the riser (for example, the side nearest the source). Such a filtering will reduce the contribution from other features in the scan results, including contributions from the strands on the opposite side of the riser (for example, the side nearest the detector). Advantageously, isolating the features from each side of the riser in this manner may enable any defects or problems with the tensile armour layers to be more easily and quickly identified, for example using automated algorithms that analyses the filtered scan results. Because the filtering improves the signal to noise ratio for the useful information in the image, the ease of identification of features of interest in the image is significantly improved, which in turn facilitates the process of automatic defect recognition.

The filter may be created manually, for example by defining a polygonal mask, but is preferably created using an automatic computational method, such as maximizing the cross correlation of the Fourier transformed results with a function selected to pick out desired features.

For example, an X-shaped mask may select features from two different armour layers, both on the same side of the riser or a mask consisting of only one line of the X may leave only contributions from one armour layer.

The method may comprise detecting a failure mode in a flexible riser. The failure mode is preferably selected from armour slippage, armour corrosion, snapped armour strand, collapsed carcass, flooded annulus, or pipe blockage.

The failure mode may be armour slippage, armour corrosion or a snapped armour strand. Those failure modes typically result from armour strands corrosion. The corrosion is itself a failure mode that is preferably detected, but may also lead to armour slippage or armour strand snaps. Such failure modes are relatively common in flexible risers. When tension is reduced in the riser the corroded strands can snap or slip. Preferably the Fourier transform filtering is used as part of the method to detect these failure modes. For example, armour slippage may be identified as thicker diagonal lines in part of the filtered scan results.

The failure mode may be collapse of the inner carcass of the riser. Such failure can occur due to a sudden pressure change in the riser. The failure mode results in a distinctive pattern in the scan results. Prior art inspection methods such as UT and magnetic stress measurements may not be able to see this failure mode and it is therefore a significant advantage of the present invention that the collapsed carcass failure mode can be detected.

The failure mode may be a flooded annulus or pipe blockage. Preferably the failure mode is a flooded annulus. In that failure mode, water enters the internal structure of the riser and can lead to corrosion of the metal structure. Preferably the method comprises comparing overall count rates axially along the riser to detect a flooded annulus or pipe blockage. For example, when the scan covers a flooded area a reduction in counts across the whole scan result in comparison to non-flooded sections would be expected due to the increased attenuation from the water. Similarly large blockages in the riser would also be identifiable in this way.

The present invention improves on the state of the art by combining detection of all the above failure modes. Preferably all of the failure modes are detectable from scanning the riser at an axial speed of at least 15 cm/min and preferably at least 30 cm/min. While the failure modes above are described with respect to flexible risers, it will be appreciated that similar failure modes in other pipelines may also be detected. Thus the method may comprise detecting a failure mode in a pipeline, the failure mode being preferably selected from armour slippage, armour corrosion, snapped armour strand, collapsed carcass, flooded annulus, or pipe blockage.

The invention may be used in circumstances where there is multiphase flow within a structure, for example a pipe, being inspected. The method may comprise rotating the detectors and the source around a part of the structure multiple times and recording data at equivalent positions in each rotation. The method may further comprise using the data from the multiple rotations to reduce the impact of multiphase flow on the data. For example, the method may comprise averaging the data across multiple rotations. That may reduce the impact of transient flow conditions, such as slugging, on the data and help to improve the signal-to-noise ratio of the data. The method may comprise selecting the minimum value at each location across multiple rotations. That may remove, preferably fully, the effect of gas slugs in a predominantly water flow, but may not make use of all the valid data available to increase the signal to noise ratio. Alternatively the method may comprise selecting the maximum value at each location across multiple rotations. That may remove, preferably fully, the effect of water slugs in a predominantly gas flow, but again may not make use of all the available valid data for increasing the signal to noise ratio. Preferably the method comprises eliminating outliers at each location across multiple rotations and further comprises averaging the remaining data at each location. In that way outliers resulting from slugs are removed, but all the valid data is used to maximise the signal to noise ratio.

The invention may make use of a model to counter the impact of types of multiphase flow. For example, the invention may comprise the step of adjusting the data, for example using a calibration profile, to account for stratified multiphase flow. A typical stratified flow may comprise a water layer, an oil layer above the water layer and a gas layer above the oil layer. The different layers will have different attenuations and will thus produce a systematic variation in the count rates as the source and detectors are rotated around. By carrying out a calibration on a region of pipe in which there are no significant defects, preferably including averaging the axial results so as to produce a single, circumferential radiation profile, a calibration profile that accounts for the variation due to the stratified flow may be created. Alternatively a calibration profile may be created computationally, for example if the attenuations of the materials are known. The calibration profile may be used to remove variations due to the stratified flow from the data when a scan is performed. The calibration profile may also be used to determine the heights of the layers in the stratified flow. That may be achieved by adjusting the layer heights in a theoretical model of the attenuation to fit the observed calibration profile.

It will be appreciated that when the linear array is said to be substantially parallel to the axis of rotation, the linear array may be at an angle of 15 degrees or less, preferably 10 degrees or less, more preferably 5 degrees or less, yet more preferably 2 degrees or less and even more preferably 1 degree or less to the axis of rotation. Axial, angular or circumferential, and radial will be understood as referring to a cylindrical coordinate system based on the axis of rotation. Preferably the structure to be scanned has, at least locally, an elongate nature (for example, a pipeline would have a generally elongate form) and the axis of the structure is aligned, and preferably coincident, with the axis of rotation.

When data is said to be recorded, it will be appreciated that the data may be stored in a form that permits later transmission or processing, or that the data is measured and is either immediately transmitted or processed into new data, or transiently stored before being transmitted or processed into new data.

According to a second aspect of the invention there is provided a subsea apparatus for scanning a subsea structure to detect differences in density between different parts of the subsea structure, the apparatus comprising:

a source of gamma radiation; and
a plurality of detectors arranged to detect gamma radiation emitted by the source;
wherein the source and the detectors are arranged for rotation in a fixed relationship with respect to each other, about an axis of rotation located between the source and the detectors;
wherein the plurality of detectors are arranged in a linear array, the linear array being substantially parallel to the axis of rotation.

The linear array of detectors preferably comprises 100 or more, preferably 200 or more, more preferably 300 or more detectors. Each detector preferably has a dimension of from 0.1 to 2.0 mm and more preferably 0.5 to 1.0 mm along the length of the array. The linear array of detectors may comprise a line camera. The linear array of detectors may comprise a scintillator or an array of scintillators mounted on an array of photodetectors. The photodetectors may be optically coupled to the scintillators in order to detect and measure light generated by the scintillators in response to photons of radiation from the source. Each photodetector generates an electrical signal in response to light entering it through an optical window. The wavelengths detected by the photodetector are preferably matched as far as possible to the wavelengths generated by the scintillator to maximise the detection efficiency. Preferably a photodetector is provided for each scintillator so that the amount of radiation detected by each scintillator can be measured independently of the other scintillators. The photodetectors may be photodiodes. The photodetectors may be photomultipliers, for example photomultiplier tubes or silicon photomultipliers. Preferably the photodetectors are silicon photomultipliers. Silicon photomultipliers may be particularly advantageous in subsea applications due to their low power requirements, small size and high sensitivity. Although prior art detectors may be used in the invention, improved results may be obtained with improved detectors. We have found that detectors as described below may have a sensitivity of 100 to 5000 cps/mSv/hr or greater, compared to a sensitivity of around 0.1 to 10 cps/mSv/hr for prior art detectors. Preferably the linear array of detectors comprises a linear pixelated detector array. Preferably the linear pixelated detector array comprises 100 or more, preferably 200 or more, preferably 300 or more pixels. The array preferably comprises an array of scintillators, preferably BGO (Bismuth Germanate) or most preferably CWO (Cadmium Tungstate) scintillators, the scintillators preferably having a depth of not less than 1 mm, and an array of photodetectors optically coupled to the array of scintillators such that each scintillator is associated with at least one photodetector, the photodetectors being avalanche photodiode arrays or silicon photomultipliers.

The scintillator may have a depth of 1 mm to 10 mm, preferably 2 mm to 8 mm, more preferably 1 mm to 4 mm and yet more preferably 2 mm to 4 mm. Such a depth may allow for complete capture of the incoming radiation without unnecessarily increasing the size of the subsea apparatus. Preferably the photodetectors are silicon photomultipliers. It will be understood that the 'depth' of the scintillator is the depth parallel to the incoming radiation (that is, perpendicular to the surface designed to receive the radiation) and is thus the depth through which radiation incident on the detecting surface of the scintillator must travel to exit the other end of the scintillator. Preferably the pixels are separated by a layer of optically reflective material, for example foil, such as aluminium foil. Preferably the layer has a thickness of less than 50 microns. The detector may be configured to register the electrical current or charge output over time, but preferably the detector is configured to register the number of photon pulses in a given voltage window. The window may be open, that is having only one end defined, or may be closed, having two ends defined.

The linear array of detectors may be mounted in a pressure-resistant housing. For example, the detectors may be arranged in a linear array along a tube. The tube may be configured to resist the pressures exerted by water at a depth of 3000 m.

The detectors may comprise a detection surface which is configured to receive the radiation being detected. It will be understood that the detectors may be mounted such that the detection surface intersects a path of radiation emitted by the source, preferably at a particular distance from and a particular angle to the radiation source. A collimator may be provided in front of (that is, on the side of the detection surface in the direction of the source) the detection surface of the detectors. The collimator may comprise a slit that runs parallel to the axis of rotation and along in front of the detection surfaces of the detectors arranged in the linear array. The slit may for example be a slit in a block of collimator material or a gap between two or more pieces of collimator material. The slit collimator may thus impede radiation reaching the detector that results from scattering at locations angularly displaced from the angular line of sight from the source to the detectors. However, the slit collimator may allow radiation to reach the detectors along paths in the plane containing the axis of rotation and the angular lines of sight from the source to the detectors. Such a slit collimator may be advantageous in reducing noise from scattering whilst maintaining a high axial resolution. Reduced noise advantageously results in clearer images with better contrast. The collimator slit may have a depth of from 10 to 50 mm, preferably from 20 to 40 mm. Such a slit depth may result in a significant improvement in the image quality without requiring a collimator that is too large or heavy. The size of the collimator may be particularly important in subsea applications. The detectors may each be provided with their own "tunnel" collimator, which may further reduce the noise from scattering, but doing so may restrict the axial spacing of the detectors.

The collimator may have a further advantage in a subsea apparatus, in that the collimator may provide structural support to the apparatus. For example, when the linear array of detectors is mounted in a pressure-resistant housing, the collimator may at least partially occupy a space between the detection surfaces of the detectors and the housing. In that way the collimator may provide structural strength to the housing in a way that an air-filled space would not provide.

The collimator may comprise a material which is highly attenuating or impermeable to the radiation emitted by the source, for example the collimator may comprise lead or a heavy alloy. The collimator may comprise tungsten. The collimator may cover a part of the detecting surface of the detector to delimit the portion of the detecting surface on which radiation may impinge.

The source may be housed in a source unit comprising a source of gamma radiation, a source-holder and a collimator. The collimator and source-holder may be combined. The collimator is formed of a material which is highly attenuating to the radiation emitted by the source and is normally formed of a heavy alloy material of the type known and commonly used for shielding radiation of the appropriate energy and type. The collimator is located and adapted to limit the radiation emitted by the source unit to a predetermined beam shape and direction. Preferably the radiation beam is shaped by the collimator to form a sector having the source as origin and directly illuminating the linear array of detectors. A preferred beam shape is a cylindrical sector, i.e. a sector having a thickness rather than being planar. Preferably the beam is collimated to provide a beam area at the location of the detectors which has the same general shape and area as the combined detecting surfaces of the array of detectors. The source unit may be mounted on a support.

The radiation source may be selected by the transparency to the radiation of the material(s) to be measured, e.g. a pipeline and/or its contents (i.e. the attenuation coefficient of the medium) and the availability of suitable sources and detectors. For scanning large solid structures such as process vessels and pipelines, suitable sources of gamma include $^{60}Co$, $^{137}Cs$, $^{133}Ba$, $^{241}Am$, $^{24}Na$, $^{182}Ta$ and $^{192}Ir$, however any gamma-emitting isotope of sufficient penetrating power could be used. Preferably, the half-life of the radioisotope used will be at least 2, and desirably at least 10, years. The half-lives of the radioisotopes mentioned above are: $^{60}Co$ about 5 years, $^{137}Cs$ about 30 years, $^{133}Ba$ about 10 years, $^{241}Am$ about 430 years, $^{24}Na$ about 30 minutes, $^{182}Ta$ about 114 days and $^{192}Ir$ about 74 days. Suitable sources generally emit radiation at energies between about 40 and 1500 keV. $^{192}Ir$ may be a particularly preferable source, and especially preferable for subsea locations. $^{192}Ir$ may emit 310 keV, 470 keV and 600 keV gamma rays. The low energy of the rays emitted, compared, say, to $^{137}Cs$ emitting at 662 keV, may make them more susceptible to attenuation and therefore more suitable for use in a tool for detecting very small defects. That may be because, when the attenuation per unit thickness of material is high, even small differences in the thickness of the material will result in large changes in the absolute count rate received by the tool. The large attenuation may also mean that large sources are required in order to generate adequate signal to noise ratio. Large sources may be costly, or impractical, to operate safely at onshore installations, but at subsea locations it may be more practical to operate safely, because of the depth of water between the tool and the operators on the surface. Thus large, for example 20 Ci or more, preferably 30 Ci or more, preferably 40 Ci or more, preferably 50 Ci or more, preferably 100 Ci or more, preferably 150 Ci or more, preferably 200 Ci or more, preferably 250 Ci or more, sources of low energy gamma radiation, such as $Ir^{192}$ sources, may be advantageously employed in the subsea method and apparatus of the present invention. The source unit may include one or more than one source. The scanning method may utilise more than one source unit. For example the method may utilise a plurality of sources arranged in an array parallel to the axis of rotation, each source being associated with an individual detector or a linear array of detectors.

The apparatus may comprise a source container for containing the source of radiation during transport and/or deployment of the apparatus. The source container may be detachable from the apparatus. That may be advantageous in that the source container can be removed and transported or stored separately from the apparatus. It may also facilitate safe removal of the source during maintenance of the apparatus. The source container may however be an integral part of the apparatus. Such an arrangement may increase the security of the container when deployed subsea. For large sources, such as 20 to 300 Ci $^{192}Ir$ sources, Type B certified source containers (Type B(U) or Type B(M) as defined in The IAEA Regulations for the Safe Transport of Radioactive Material 2012 Edition Specific Safety Requirements No. SSR-6) may be required. The skilled person will be familiar with the certification of source containers and will appreciate the requirements for Type B certified containers. Preferably the source container comprises: a Type B certified container having a channel for containing the source; and an extension channel, the extension channel being connectable to the channel such that the source can be moved from a stored position in the channel to an operation position in the extension channel; wherein the extension channel comprises shielding such that, when the source is in the operation position, radiation from the source is emitted in a pattern determined by the shielding; wherein the certified container and the extension channel are contained within a watertight pressure vessel. By providing a source container in which a Type B certified container, which may therefore be a commercially available container, such as, for example, a Sentinel 880 Delta container, is incorporated in a pressure vessel along with an extension channel comprising shielding to produce a predetermined irradiation pattern, a cost effective source container that is suitable for transport of large sources, such as 20 to 300 Ci $^{192}Ir$ sources, may be produced. The Type B certified container may provide the necessary protection for transport, while the extension channel and pressure vessel adapt the container to provide a desired beam pattern and subsea ability. The shielding may be lead, tungsten or depleted uranium shielding. The watertight pressure vessel may be configured to resist the pressures exerted by water at a depth of 3000 m. The source container may comprise a mechanism for moving the source from the stored position to the operation position. The mechanism may comprise a winding mechanism, the mechanism may comprise a pneumatic mechanism, the mechanism may comprise a hydraulic mechanism. Preferably the mechanism is operable via an actuator accessible from outside the source container. Preferably the actuator is operable by a remotely operated vehicle, for example a subsea remotely operated vehicle of the type typically used in subsea environments. The shielding may be configured to produce a linear ray of radiation. The shielding may be configured to produce a fan of radiation. The shielding may be configured to produce a sector, preferably a cylindrical sector, of radiation. Because the shielding is associated with the extension channel, rather than the Type B certified container, the shielding may be altered or replaced to produce different beam patterns, without affecting the Type B certified container. That may permit a number of different shielding configurations to be available for the source container. The extension channel may be permanently connected to the channel. However, the extension channel is preferably releasably connected to the channel. That advantageously permits replacement of the extension channel or removal of the Type B certified container from the source container. Thus the present invention preferably provides a watertight source container comprising an extension channel contained in a shielding material so as to produce a predetermined beam pattern from a source in an operating position in the extension channel and an inner container contained within the watertight source container, the inner container comprising a channel connected to the extension channel such that a source can be moved from the operating position in the extension channel to a stored position in the channel, wherein the inner container is configured such that it complies with Type-B certification for the transport of radioactive sources. The present invention may provide an overpack for a Type-B certified container, the overpack comprising an extension channel contained in a shielding material so as to produce a predetermined beam pattern from a source in an operating position in the extension channel and a watertight container configured to contain the certified container and the shielding material, the extension channel being connectable to a channel in the certified container such that a source can be moved from the operating position in the extension channel to a stored position in the channel.

The scanning apparatus comprises a linear array of radiation detectors. For example the scanning unit may comprise a linear array of at least 10 detectors, preferably at least 50 detectors. A preferred embodiment of the invention comprises a block of shielding material (a "detector block") having a slit opening extending inwardly from a surface of the block and containing the array of detectors, the detecting surfaces of the detectors being accessible to radiation from outside the block. A portion of the detecting surfaces may be covered by shielding material for the purposes of delimiting the area of the detecting surfaces or for mechanically retaining the detectors within the opening. The non-detecting surfaces of the detectors may optionally be enclosed partially or wholly within the opening and covered by the shielding material. The detector block includes means by which the collecting surfaces of the scintillators may be brought into contact with photodetectors or light transmitters. Such means may take the form of an opening through which the scintillators extend so that the collecting surfaces are accessible to the photodetectors or light transmitters.

The apparatus may further comprise a signal/data processor for operating on the electrical signal from the detectors. The apparatus may further comprise a controller to control the operation of the apparatus. The signal/data processor may comprise a data acquisition part configured to receive electrical pulses from a detector and count the electrical pulses. The data acquisition part may be configured to count only those pulses satisfying specified criteria, for example having a pulse height within a window or above a threshold, as described in relation to the method of the invention above. Signals representative of the counts of photons detected by the scintillators may be processed by the data processor. The signal may be subjected to smoothing or stabilisation algorithms, averaged or otherwise operated on. A data processor may perform calculations based on the signal from the radiation detector or from a signal processor if present. The data processor may output information concerning the amount of radiation measured over a time interval, or it may further calculate derived properties of the scanned structure, usually in the form of a bulk density or a change in bulk density between radiation paths through the structure. The data processor may contain a calibration or information concerning the radiation source. The data processor output may be connected to a display or a (optionally wireless) transmission means so that a signal can be sent from the apparatus to a remote location. Alternatively a signal comprising data from the detectors themselves may be sent, for processing at a remote location. A power supply may be provided to power the photodetectors, data processor and control electronics and also to power motors for moving the apparatus. The power supply for the motors may be a hydraulic power supply.

Movement of the scanning apparatus, for example to open and close the apparatus, to crawl the apparatus along the structure and to rotate the source and the detectors, may be accomplished by means of electrically or, preferably, hydraulically powered motors or actuators.

The positioning of the subsea structure between the source and the detectors may be achieved by deploying the apparatus so that the source unit and detector units are positioned in relation to the subsea structure to be scanned so that one or more radiation paths from the source to the detectors pass through the desired portion of the subsea structure. The apparatus may be deployed using an ROV (remotely operated vehicle) at subsea locations and may be provided with clamping means to secure the apparatus to the subsea structure. The clamping means advantageously holds the apparatus in a fixed position relative to the subsea structure while the source and detectors are rotated so as to allow the rotation of the source and detectors about the axis of rotation to be related to rotation about the subsea structure. Preferably the subsea structure is an elongate structure, for example a pipeline, having an axis, or at least a local axis for the section of the subsea structure where the apparatus is deployed, and the axis of rotation lies along the axis of the subsea structure. The scanning method may then be carried out at a plurality of circumferentially offset positions around the structure so that density data may be acquired at a variety of angles through the structure. The apparatus may then be moved to a different location, preferably a different axial location, with respect to the structure and the measurement repeated. In this way a record of the attenuation to radiation through each radiation path through the structure may be gathered and used to calculate the location of changes or to build a representation of the structure and its contents. Information such as changes in density which may highlight flaws or other features, such as blockages for example, within the structure can be obtained.

Preferably the apparatus is provided with crawler apparatus for moving along the subsea structure. In that way the apparatus need only be deployed with an ROV at the start of the scanning process and can then be moved along the structure using the crawler apparatus provided.

Whilst the invention has been described above in relation to subsea operation and structure, it will be appreciated that aspects of the invention may also be advantageously deployed at other locations, for example onshore locations. In a third, broad aspect of the invention, there is provided a method for scanning a structure, preferably a subsea structure, to detect differences in density between different parts of the structure, the method comprising:

providing a source of radiation, preferably gamma radiation;

providing a plurality of detectors arranged to detect radiation emitted by the source;

positioning the structure between the source and the detectors; and rotating the detectors and the source in a fixed relationship to each other about an axis of rotation located between the detectors and the source;

wherein the plurality of detectors are arranged in a linear array, the linear array being substantially parallel to the axis of rotation.

The method may further comprise a step of recording data related to the count rate of radiation detected by each detector at each of a plurality of angular positions. The method may include a step of analysing the data to detect differences in density between different parts of the structure. The method may further comprise a step of providing a second source of radiation, preferably gamma radiation; providing a second plurality of detectors arranged to detect radiation emitted by the second source; positioning a part of the structure identified as having a potential defect in the analysis of the data between the second source and the second detectors; and rotating the second detectors and the second source in a fixed relationship to each other about an axis of rotation located between the second detectors and the second source; wherein the second plurality of detectors are arranged in an arcuate array, the arcuate array being in a plane perpendicular to the axis of rotation. Preferably the second source and the second detectors are provided at a location, for example an axial location, of a defect identified in a first scan using the source the linear array of detectors. The second source and the second detectors may comprise collimators such that a plurality of linear radiation paths between each of the second detectors and the second source are defined by the collimators. The subsequent scanning of the structure using an arcuate array may permit radially resolved information to be provided about the defect identified in the scan using the linear array. The second source and second detectors may be provided as part of the same apparatus as the source and the detectors, or may be provided as part of a separate apparatus.

In a fourth, broad aspect of the invention there is provided an apparatus, preferably a subsea apparatus, for scanning a structure, preferably a subsea structure, to detect differences in density between different parts of the structure, the apparatus comprising:
  a source of radiation, preferably gamma radiation; and
  a plurality of detectors arranged to detect radiation emitted by the source;
  wherein the source and the detectors are arranged for rotation in a fixed relationship with respect to each other, about an axis of rotation located between the source and the detectors;
  wherein the plurality of detectors are arranged in a linear array, the linear array being substantially parallel to the axis of rotation.

The apparatus may further comprise a second source of radiation, preferably gamma radiation; and a second plurality of detectors arranged to detect radiation emitted by the second source; wherein the second source and the second detectors are arranged for rotation in a fixed relationship with respect to each other about an axis of rotation located between the second detectors and the second source; wherein the second plurality of detectors are arranged in an arcuate array, the arcuate array being in a plane perpendicular to the axis of rotation. The second source and the second detectors may comprise collimators such that a plurality of linear radiation paths between each of the second detectors and the second source are defined by the collimators. The apparatus may be arranged such that either the source and the detectors or the second source and the second detectors may be operational at any one time. Such an arrangement may allow preliminary scanning to be carried out using the source and the detectors (in the linear array) and then further, radially resolved, scanning of defects identified to be carried out by the same apparatus using the second source and second detectors. That may be particularly efficient since only one piece of apparatus may need deploying in order to carry out a complete scan.

The improved detectors described above are an important invention in their own right and may have independent utility. Thus, according to a fifth aspect of the invention there is provided a pixelated detector array, the detector array comprising an array of scintillator crystals, preferably BGO and more preferably CWO, having a depth of not less than 1 mm and an array of photodetectors optically coupled to the array of scintillators such that each scintillator is associated with at least one photodetector. The scintillator may have a depth of 1 mm to 10 mm, preferably 2 mm to 8 mm, more preferably 1 to 4 mm and yet more preferably 2 mm to 4 mm. Preferably the photodetectors are silicon photomultipliers.

We have found that such detectors may have a sensitivity of 100 to 5000 cps/mSv/hr or greater, compared to a sensitivity of around 0.1 to 10 cps/mSv/hr for prior art detectors.

Preferably the pixelated detector array comprises a linear pixelated detector array. That is, the pixelated detector array may comprise a linear array of scintillator crystals, preferably BGO, more preferably CWO, having a depth of not less than 1 mm and an array of photodetectors optically coupled to the array of scintillators such that each scintillator is associated with at least one photodetector. The scintillator may have a depth of 1 mm to 10 mm, preferably 2 mm to 8 mm, more preferably 1 to 4 mm and yet more preferably 2 mm to 4 mm. Preferably the photodetectors are silicon photomultipliers.

Preferably the scintillator pixels are separated by a layer of optically reflective material, for example foil, such as aluminium foil. Preferably the layer has a thickness of less than 50 microns. By providing a thin, reflective layer between the scintillator pixels the sensitivity of the detector array may be improved and the cross-talk between adjacent pixels reduced. However, in some embodiments there may be no layer separating adjacent pixels. We have found that for crystal scintillators, the cut edges of the crystals may have sufficient internal reflection to prevent significant loss of light to adjacent pixels. By using cut crystals, for example rough-cut crystals, the expense of providing a foil coating, or other separating layer, may therefore be avoided.

Preferably the pixelated detector array is configured to register the number of photon pulses in a given window, for example a voltage or current window. The window may be open, that is having only one end defined, or may be closed, having two ends defined. It will be appreciated that measuring a count rate of current pulses may produce data that is less noisy than data obtained by integrating current over time where the radiation being detected is gamma radiation.

Preferably the pixelated detector array comprises a multi-channel analyser (MCA), for example a 4 to 16 multi-channel analyser, for each pixel. Providing an MCA for each pixel may allow the pixelated detector array to register the count rate resolved across the energy spectrum of incoming pulses in sufficient detail to permit stabilisation or other adjustments to be performed, preferably in real time or at least without analysis at, or input from, a remote location, based on features, for example photopeaks, within the spectrum.

The pixel size, that is the length and width of the detecting surfaces of the scintillators in the plane of the array for two-dimensional arrays or the length of the detecting surfaces of the pixels along the length of the array for linear arrays, may be in the range 0.5 to 1 mm. Such a range is significantly larger than many prior art pixelated arrays designed for medical x-ray imaging, but may be advantageous when used with gamma radiation sources, particularly in methods and apparatus of the invention, where detecting low count rates may be more valuable than very fine spatial resolution.

Preferably the pixelated detector array is a linear pixelated detector array mounted in a pressure-resistant housing. For example, the linear pixelated detector array may be arranged along a tube. The tube may be configured to resist the pressures exerted by water at a depth of 3000 m. Preferably the scintillation crystals comprise a detection surface which is configured to receive the radiation being detected and a collimator is provided in front of the detection surface of the scintillation crystals. The collimator may comprise a slit that runs parallel to the linear axis of the array and along in front of the detection surfaces of the scintillation crystals.

The collimator may be particularly advantageous when the pixelated detector array is used in a subsea apparatus, in that the collimator may provide structural support to the apparatus. For example, when the linear pixelated detector array is mounted in a pressure-resistant housing, the collimator may at least partially occupy a space between the detection surfaces of the scintillation crystals and the housing. In that way the collimator may provide structural strength to the housing in a way that an air-filled space would not provide. The collimator may comprise a material which is highly attenuating or impermeable to radiation, for example the collimator may comprise lead or a heavy alloy. The collimator may cover a part of the detecting surface of the linear pixelated detector array to delimit the portion of the detecting surface on which radiation may impinge.

According to a sixth aspect of the invention there is provided an apparatus, preferably a subsea apparatus, for scanning a structure, preferably a subsea structure, to detect differences in density between different parts of the structure, the apparatus comprising:
  a source of radiation, preferably gamma radiation; and
  a plurality of detectors arranged to detect radiation emitted by the source;
  wherein the plurality of detectors comprise a pixelated detector array, the detector array comprising an array of scintillator crystals, preferably BGO, more preferably CWO, having a depth of not less than 1 mm and an array of photodetectors optically coupled to the array of scintillators such that each scintillator is associated with at least one photodetector. The scintillator may have a depth of 1 mm to 10 mm, preferably 2 mm to 8 mm, more preferably 1 mm to 4 mm and yet more preferably 2 mm to 4 mm. Preferably the photodetectors are silicon photomultipliers.

Preferably the source and the detectors are arranged for rotation in a fixed relationship with respect to each other, about an axis of rotation located between the source and the detectors. Preferably the plurality of detectors are arranged in a linear array. Preferably the linear array is substantially parallel to the axis of rotation.

According to a seventh aspect of the invention, there is provided a method for scanning a structure, preferably a subsea structure, to detect differences in density between different parts of the structure, the method comprising:
  providing a source of radiation, preferably gamma radiation; and
  providing a plurality of detectors arranged to detect radiation emitted by the source;
  wherein the plurality of detectors comprise a pixelated detector array, the detector array comprising an array of scintillator crystals, preferably BGO, more preferably CWO, having a depth of not less than 1 mm, preferably a depth of 1 mm to 4 mm, and an array of silicon photomultipliers photodetectors optically coupled to the array of scintillators such that each scintillator is associated with at least one photodetector.

Preferably the method comprises positioning the structure between the source and the detectors. Preferably the method comprises rotating the detectors and the source in a fixed relationship to each other about an axis of rotation located between the detectors and the source. Preferably the plurality of detectors are arranged in a linear array. Preferably the linear array is substantially parallel to the axis of rotation.

The source container described above is an important invention in its own right and may have independent utility. Thus, according to an eighth aspect of the invention there is provided a source container comprising: a Type B certified container having a channel for containing the source; and an extension channel, the extension channel being connectable to the channel such that the source can be moved from a stored position in the channel to an operation position in the extension channel; wherein the extension channel comprises shielding such that, when the source is in the operation position, radiation from the source is emitted in a pattern determined by the shielding; wherein the Type B certified container and the extension channel are contained within a watertight pressure vessel. The shielding may be lead, tungsten or depleted uranium shielding. Preferably the Type B certified container and the shielding substantially fill the watertight pressure vessel. In that way the shielding may contribute to the strength of the pressure vessel due to the relative incompressibility of the shielding material compared, say, to air. Preferably the Type B certified container and the shielding are each separately removable from the watertight pressure vessel. In that way the beam pattern provided by the shielding may be changed or the source removed, whilst still in the Type B certified container, to be transported separately or to allow maintenance of the equipment in which the source container is installed. Preferably the extension channel is a rigid channel. Preferably the extension channel comprises a fixed channel through the shielding, wherein the shielding is solid shielding. The extension channel may be a bore through the shielding or the extension channel may be installed in a bore through the shielding. In either case, the shielding preferably fixedly defines the location of the channel. In that way the precise location and orientation of the extension channel is fixed and remote operation of the device can be relied upon to move the source accurately to a fixed operating position. That may be particularly important if the source container is deployed in subsea locations for the purposes of scanning, and when the precise location of the source during the scan may be important in interpreting the scan results. The watertight pressure vessel may be configured to resist the pressures exerted by water at a depth of 3000 m. The source container may comprise a mechanism for moving the source form the stored position to the operation position. The mechanism may comprise a winding mechanism. The mechanism may comprise a pneumatic mechanism. The mechanism may comprise a hydraulic mechanism. Preferably the mechanism is operable via an actuator accessible from outside the source container. Preferably the actuator is operable by a remotely operated vehicle, for example remotely operated vehicles typically used in subsea environments. The shielding may be configured to produce a linear ray of radiation. The shielding may be configured to produce a fan of radiation. The shielding may be configured to produce a sector, preferably a cylindrical sector, of radiation. The extension channel may be permanently connected to the channel. However, the extension channel is preferably releasably connected to the channel.

According to a ninth aspect of the invention there is provided an apparatus, preferably a subsea apparatus, for scanning a structure, preferably a subsea structure, to detect differences in density between different parts of the structure, the apparatus comprising:

a source of radiation, preferably gamma radiation; and a plurality of detectors arranged to detect radiation emitted by the source;

wherein the apparatus comprises a source container comprising: a Type B certified container having a channel for containing the source; and an extension channel, the extension channel being connectable to the channel such that the source can be moved from a stored position in the channel to an operation position in the extension channel; wherein the extension channel comprises shielding such that, when the source is in the operation position, radiation from the source is emitted in a pattern determined by the shielding; wherein the certified container and the extension channel are contained within a watertight pressure vessel.

Preferably the source and the detectors are arranged for rotation in a fixed relationship with respect to each other, about an axis of rotation located between the source and the detectors. Preferably the plurality of detectors are arranged in a linear array. Preferably the linear array is substantially parallel to the axis of rotation.

According to a tenth aspect of the invention, there is provided a method for scanning a structure, preferably a subsea structure, to detect differences in density between different parts of the structure, the method comprising:

providing a source of radiation, preferably gamma radiation; and providing a plurality of detectors arranged to detect radiation emitted by the source;

wherein the source is provided in a source container comprising: a Type B certified container having a channel for containing the source; and an extension channel, the extension channel being connectable to the channel such that the source can be moved from a stored position in the channel to an operation position in the extension channel; wherein the extension channel comprises shielding such that, when the source is in the operation position, radiation from the source is emitted in a pattern determined by the shielding; wherein the certified container and the extension channel are contained within a watertight pressure vessel.

Preferably the method comprises the step of moving the source from the stored position to the operation position. Preferably the method comprises providing the source in the stored position at a surface location, deploying the source to a subsea location and moving the source to the operation position at the subsea location. Preferably the movement is performed by a remotely operated vehicle. By moving the source to the operation position once at a subsea location, the radiation risk to operators on the surface is greatly reduced. Preferably the method comprises positioning the structure between the source and the detectors. Preferably the method comprises rotating the detectors and the source in a fixed relationship to each other about an axis of rotation located between the detectors and the source. Preferably the plurality of detectors are arranged in a linear array. Preferably the linear array is substantially parallel to the axis of rotation.

It will be appreciated that features described in relation to one aspect of the invention may be equally applicable in another aspect of the invention. For example, features described in relation to the methods of the invention, may be equally applicable to the apparatus of the invention, and vice versa. Some features may not be applicable to, and may be excluded from, particular aspects of the invention.

DESCRIPTION OF THE DRAWINGS

An embodiment of the present invention will now be described, by way of example, and not in any limitative sense, with reference to the accompanying drawings, of which.

DETAILED DESCRIPTION

Figure 1:
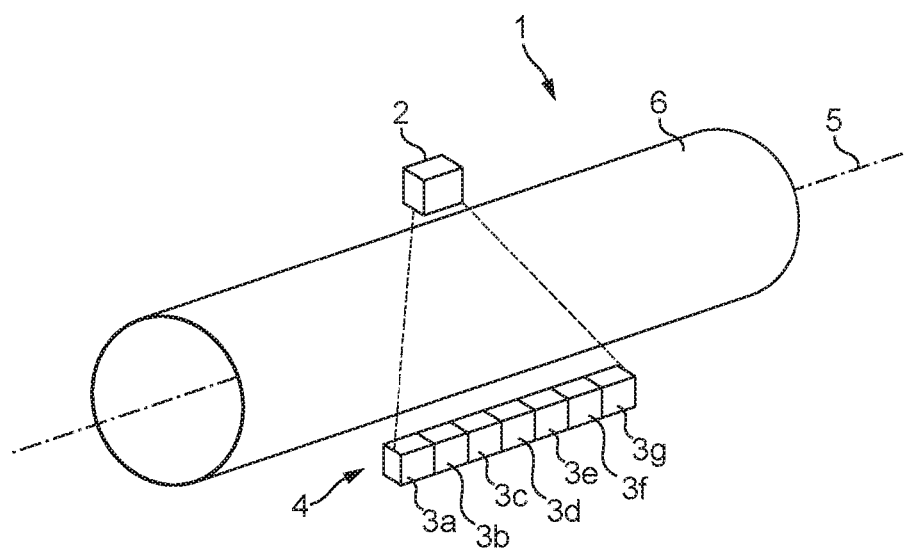
FIG. 1 is a schematic representation of a first embodiment of the invention.
Figure 2:
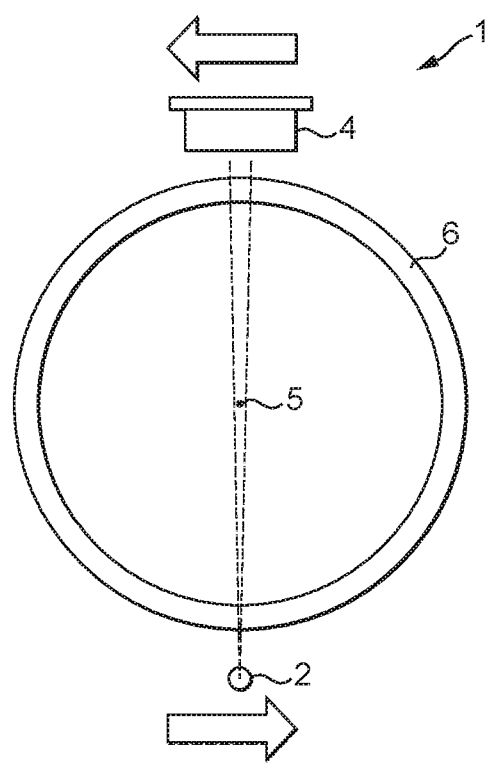
FIG. 2 is a schematic representation of the first embodiment of the invention in use.

In FIGS. 1 and 2, an apparatus 1 comprises a source of radiation 2, and a plurality of detectors 3a, 3b, 3c, 3d, 3e, 3f, 3g arranged to detect radiation emitted by the source 2. The plurality of detectors 3a, 3b, 3c, 3d, 3e, 3f, 3g are arranged in a linear array 4. The source 2 and the linear array 4 are arranged to rotate in fixed relationship with respect to each other about an axis of rotation 5. In use, a structure 6 is positioned between the source 2 and the linear array 4, typically by means of securing an apparatus comprising the source 2 and the linear array 4 to the structure 6. The source 2 and the linear array 4 are then rotated in fixed relationship with respect to each other around the structure 6 and data relating to the number of counts received by each of the detectors 3a, 3b, 3c, 3d, 3e, 3f, 3g continuously recorded. The data is recorded in a series of sample bins, each bin relating to a fraction of the total angular rotation of the source 2 and the linear array 4 around the structure 6. By comparing the count rates at different angular positions, information about differences in density of the structure 6 can be obtained.

Figure 3:
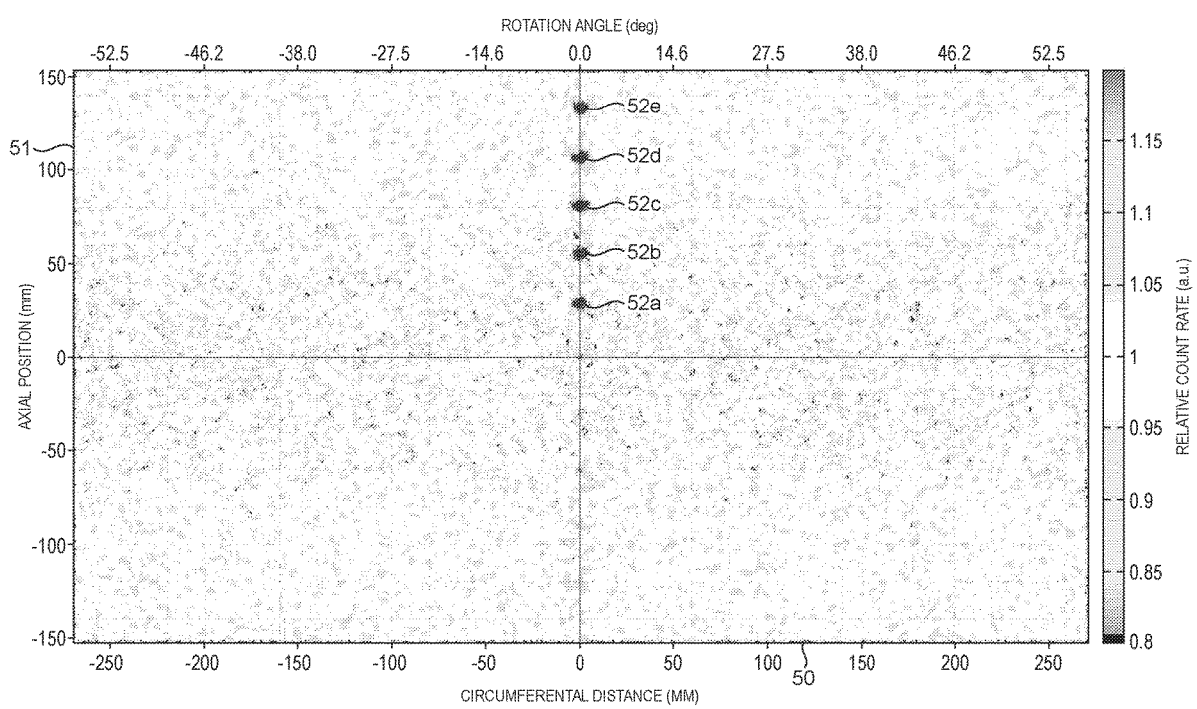
FIG. 3 is an example image of a scan.

FIG. 3 is an example image of a scan result. The intensity of the image represents the count rate and hence the density of the structure at each location. The x-axis 50 covers angular locations from −90 degrees to 90 degrees, thus defining a 180 degree scan, determined by the total angle through which the source and detectors have been rotated during the scan. The y-axis 51 covers axial locations from −150 mm to 150 mm thus defining a 300 mm axial scan length, determined by the length of the linear array of detectors. The scan has detected defects 52a, 52b, 52c, 52d, 52e at a series of axial locations and a common angular position. The defects are 5 mm by 5 mm by 5 mm and show up clearly in the results as anomalies compared to other axial and angular locations.

In this embodiment, the radiation source 2 is a gamma radiation source, such as $^{192}$Ir, with sufficient penetrating power for scanning dense structures such as subsea pipelines. The source 2 is surrounded by a source collimator (not shown) having a slot for collimating radiation from the source 2 in a cylindrical sector shaped beam 7 towards the detectors 3a, 3b, 3c, 3d, 3e, 3f, 3g. The source collimator is preferably formed of a material which is highly attenuating to the radiation emitted by the source 2, for example a heavy alloy material.

The detectors 3a, 3b, 3c, 3d, 3e, 3f, 3g comprise a scintillating material or crystal suitable for detecting gamma photons at this source energy, for example BGO (bismuth germanate) or CWO (Cadmium Tungstate). Photodetectors are provided for receiving light emitted by each respective scintillation crystal of the detectors 3a, 3b, 3c, 3d, 3e, 3f, 3g and outputting an electrical signal in response to the light received from the scintillating material. Processing and analysis of the electrical signals output by the photodetectors is performed to obtain an image of the structure 6 being scanned. The detectors 3a, 3b, 3c, 3d, 3e, 3f, 3g, may be pixels of a line camera. It will be appreciated that while, by way of example and for the sake of clarity, only 7 detectors 3a, 3b, 3c, 3d, 3e, 3f, 3g are shown, the line camera may have many more pixels, such as 300 or 400 pixels, and the linear array 4 may thus contain 300 or 400 detectors or more.

Figure 4:
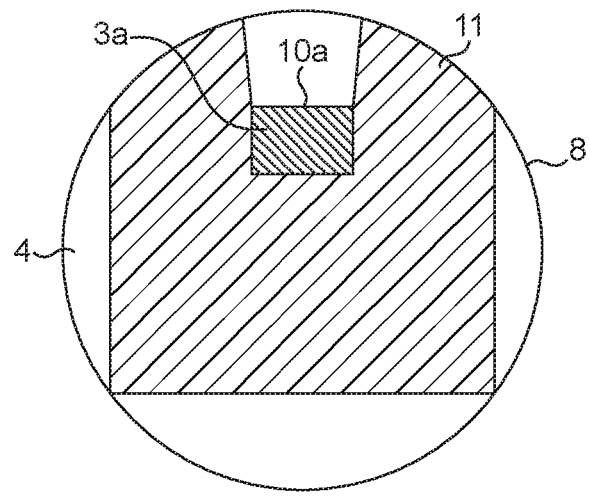
FIG. 4 is a schematic representation of a detector array used in the first embodiment.

Turning to FIG. 4, the detectors 3a, 3b, 3c, 3d, 3e, 3f, 3g are mounted in a cylindrical pressure vessel 8. Also contained within the pressure vessel is control and measurement electronics for the detectors. Only detector 3a is visible in FIG. 2, with the remaining detectors 3b, 3c, 3d, 3e, 3f, 3g behind the detector 3a along the length of the cylindrical pressure vessel 8. The cylindrical pressure vessel 8 is a steel tube, having a wall thickness of 5 mm. The detector 3a is located in a recess in a collimator 11. The recess fixes the relative position of the detector 3a and the collimator 11. The detector 3a has a detecting surface 10a, which in use is oriented toward the source 2. The collimator 11 extends into the space between the detector 3a and the inner surface of the cylindrical pressure vessel 8 in front of the detecting surface 10a. The collimator 11 is a slit collimator aligned with the length of the linear array 4. In that way, the collimator 11 permits radiation to travel from the source 2 to any of the detectors 3a, 3b, 3c, 3d, 3e, 3f, 3g in the linear array 4, but restricts the passage of scattered radiation arriving from other angles. A portion of the detecting surface 10a may be covered by shielding material of the collimator 11, for the purposes of delimiting the area of the detecting surface 10a or for mechanically retaining the detector 3a within the collimator 11. The non-detecting surfaces of the detector 3a are shielded from incident radiation by the shielding material of the collimator 11. The collimator 11 is formed of a shielding material which is attenuating to gamma radiation. A dense shielding material such as lead, tungsten, or a heavy alloy may be used, which is highly attenuating to gamma radiation. Alternatively, a less dense material such as steel may be used. This provides less shielding but is not as heavy as the denser shielding materials and may have a better strength to weight ratio. The collimator 11 also serves to provide support to the inner surface of the cylindrical pressure vessel 8.

Figure 5:
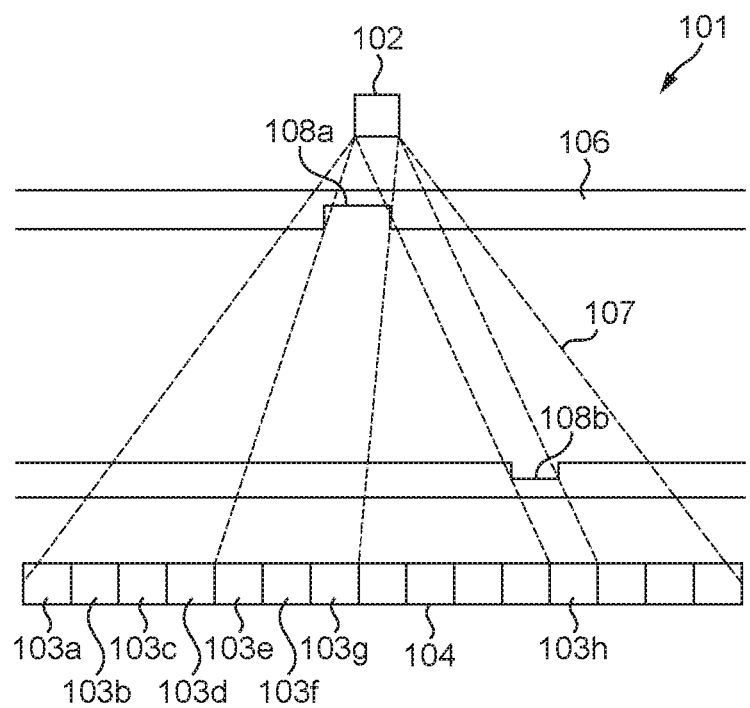
FIG. 5 is a schematic representation of a second embodiment of the invention being used to locate defects in a structure.

In FIG. 5 an apparatus 101 comprises a source 102 and a plurality of detectors in a linear array 104. The apparatus is arranged to scan a pipeline 106 located between the source 102 and the linear array 104. The pipeline 106 contains two defects 108a, 108b. The defect 108a is on the side of the pipeline 106 nearest the source 102 and the defect 108b is on the side of the pipeline 106 nearest the linear array 104. The source 102 emits a cylindrical sector beam of radiation 107 which passes through the pipeline 106 and illuminates the detectors in the linear array 104. The attenuation of the beam 107 along any particular path is related to the density of the material through which that path passes. Thus the attenuation at detectors 103a, 103b, 103c, 103d will be greater, and hence the count rate lower, than at detectors 103e, 103f, 103g, where the defect 108a has reduced the thickness of dense pipeline 106 through which the radiation beam 107 passes. By comparing the count rates along the linear array 104, or at individual detectors in the linear array 4 as it is rotated around the pipeline 106, or both, differences in density, and hence defects 108a, 108b, can be detected.

Because the angle of the beam 107 through the pipeline 106 changes along the length of the linear array 4, the count rates at either end of the linear array 104 would be expected to be a little lower than those in the middle of the linear array 104. That difference results from the increased effective thickness of pipeline 106 in the radiation path when the pipeline 106 is crossed at an angle compared to when it is crossed perpendicularly (the ratio between the two being one over the cosine of the angle at which the pipeline 106 is crossed). Since the source 102 and linear array 104 are in a fixed relationship with one another, the angles are known and the effect can be compensated for when analysing the data.

The data can also be analysed to determine which side of the pipeline 106 the defects 108a, 108b are on. Because defect 108a is on the side of the pipeline 106 nearest the source 102, the radiation shadow (it being appreciated that the "shadow" is actually a region in which more radiation passes) of defect 108a is spread across three detectors 103e, 103f, 103g. By contrast, defect 108b is on the side of the pipeline 106 nearest the linear array 104 and the radiation shadow of defect 108b is therefore confined to a single detector 103h. When the apparatus 101 has been rotated through 180 degrees (not shown) the effect will be the opposite and the radiation shadow of defect 108b will be spread across several detectors, while the radiation shadow of defect 108a will be spread across fewer detectors. By comparing the radiation shadows at positions separated by 180 degrees it is possible to determine the side of the pipeline 106 on which the defects 108a, 108b lie.

Figure 6:
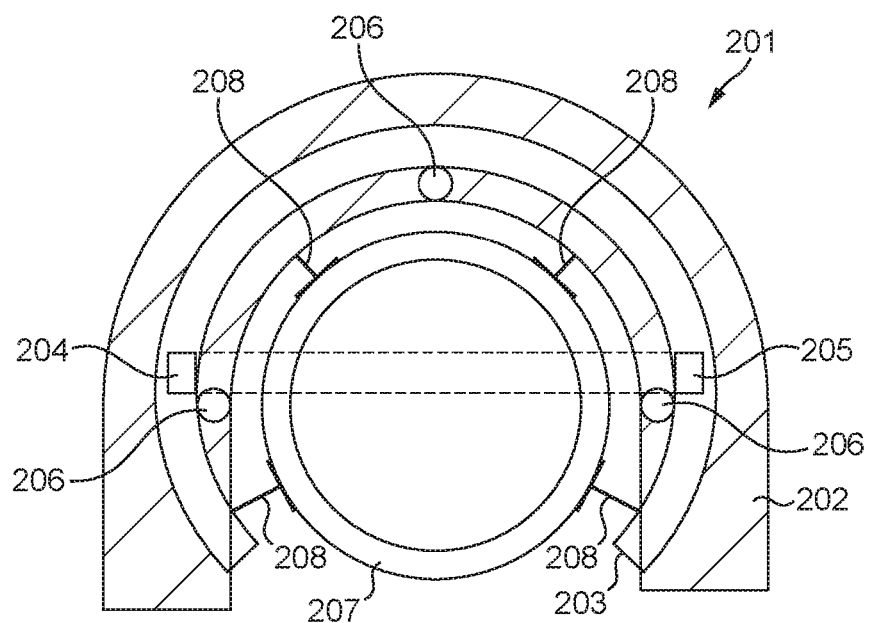
FIG. 6 is a schematic representation of a third embodiment of the present invention.

In FIG. 6 an apparatus 201 comprises a fixed part 202 and a rotating part 203. On the rotating part 203 a gamma radiation source 204 and a linear array of detectors 205 are fixed. The rotating part 203 runs on bearings 206 mounted on the fixed part 202. The fixed part 202 and the rotating part 203 surround a space in which a structure 207 to be scanned is located. Mounted on the fixed part 202 are clamps 208, which engage the structure 207 and hold the apparatus 201 in place. In use, the apparatus 201 is lowered onto the structure 207 and the clamps 208 secured. The rotating part 203 is then rotated through 360 degrees whilst the linear array of detectors 205 record the count rate of radiation they receive from the source 204. The data is analysed to detect anomalies in the count rates that indicate defects in the structure 207.

Figure 7:
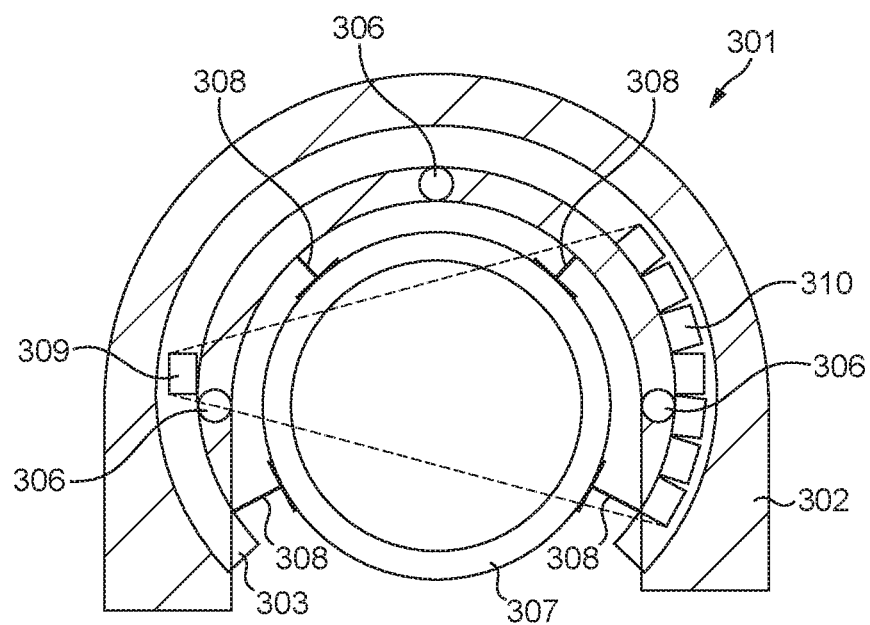
FIG. 7 is a schematic representation of an apparatus for use in a fourth embodiment of the invention.

In FIG. 7 an apparatus 301 comprises a fixed part 302 and a rotating part 303. On the rotating part 303 a second gamma radiation source 309 and an arcuate array of detectors 310 are fixed. The rotating part 303 runs on bearings 306 mounted on the fixed part 302. The fixed part 302 and the rotating part 303 surround a space in which a structure 307 to be scanned is located. Mounted on the fixed part 302 are clamps 308, which engage the structure 307 and hold the apparatus 301 in place. In use, a scan is first carried out using apparatus 201 as described above. The apparatus 301 is then lowered onto the structure 307 and the clamps 308 secured at an axial location of a defect identified in the first scan. The rotating part 303 is then rotated through 360 degrees whilst the arcuate array of detectors 310 record the count rate of radiation they receive directly from the source 309. The data is analysed to produce a radially resolved tomogram of the structure 307 at the defect location. It will be appreciated that, while a particular embodiment has been described here, other embodiments are possible. For example the second scan could be carried out using a source and arcuate array of detectors mounted on a separate rotating part of the same apparatus 201 as the first scan or on the same rotating part 203. The apparatus 301 could, for example, be an apparatus as described in GB 2496736 A.

Figure 8:
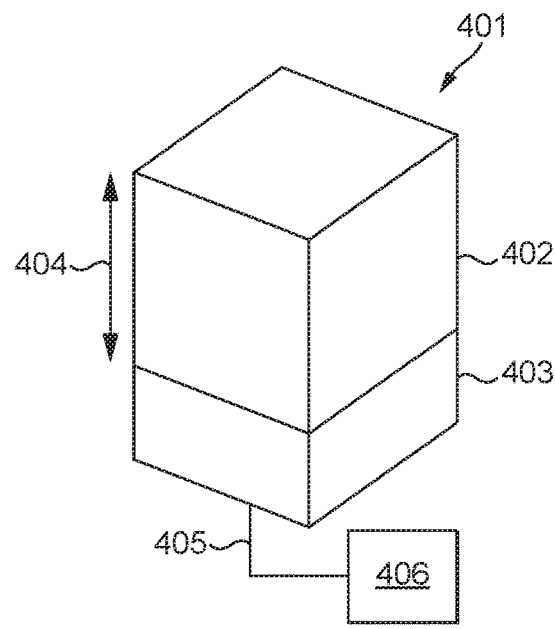
FIG. 8 is a schematic representation of a detector for use in embodiments of the invention.

In FIG. 8 a detector 401 has a BGO scintillator crystal 402 mounted on a silicon photomultiplier 403. The scintillator crystal 402 has a depth 404 of 4 mm. The output 405 from the silicon photomultiplier 403 is connected to a multi-channel analyser 406. The scintillator crystal 402 is a rough cut crystal and internal reflection at least partially prevents loss of light from the sides of the crystal 402.

Figure 9:
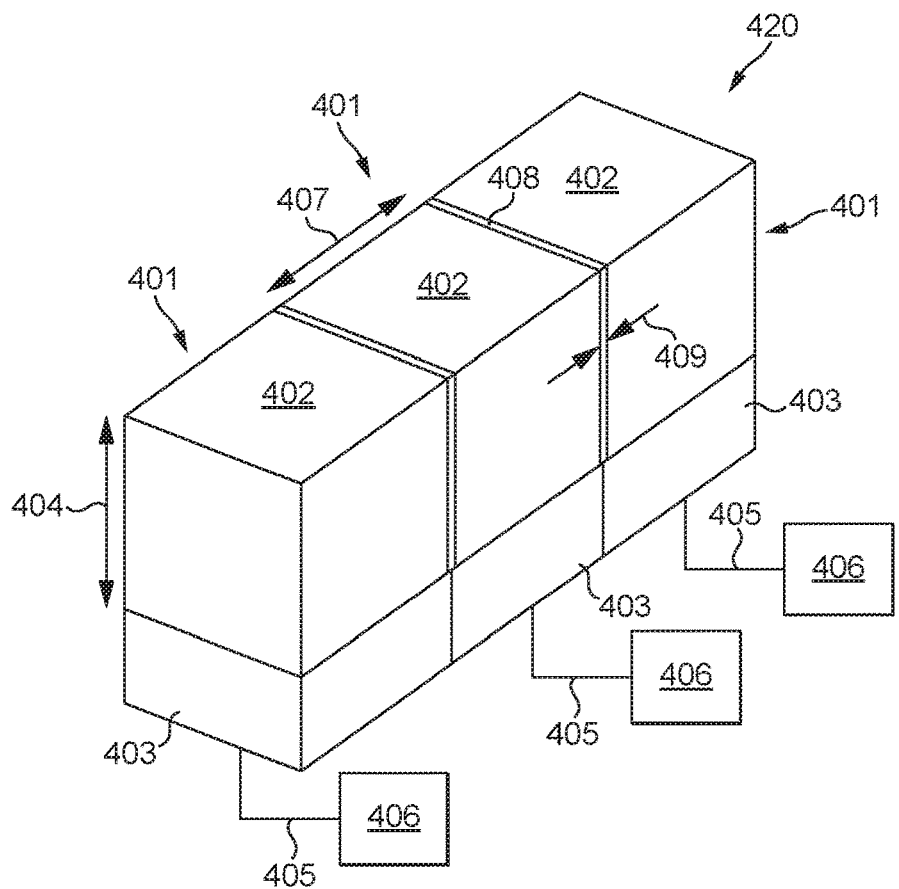
FIG. 9 is a schematic representation of a linear detector array according to a fifth embodiment of the invention.

In FIG. 9 a linear pixelated detector array 420 is formed from three detectors 401. Each detector 401 has a BGO scintillator crystal 402 mounted on a silicon photomultiplier 403. The scintillator crystals 402 have a depth 404 of 4 mm. The outputs 405 from the silicon photomultipliers 403 are connected to a separate multi-channel analyser 406 for each detector. The pixel size 407 is 0.5 mm. Between the scintillator crystals 402 there is a thin layer of aluminium foil 408 having a thickness 409 of 50 microns. The aluminium foil 408 serves to reflect light exiting the sides of the scintillator crystals 402 back into the crystals and hence on to the photomultipliers 403, thus improving the signal strength.

Figure 10:
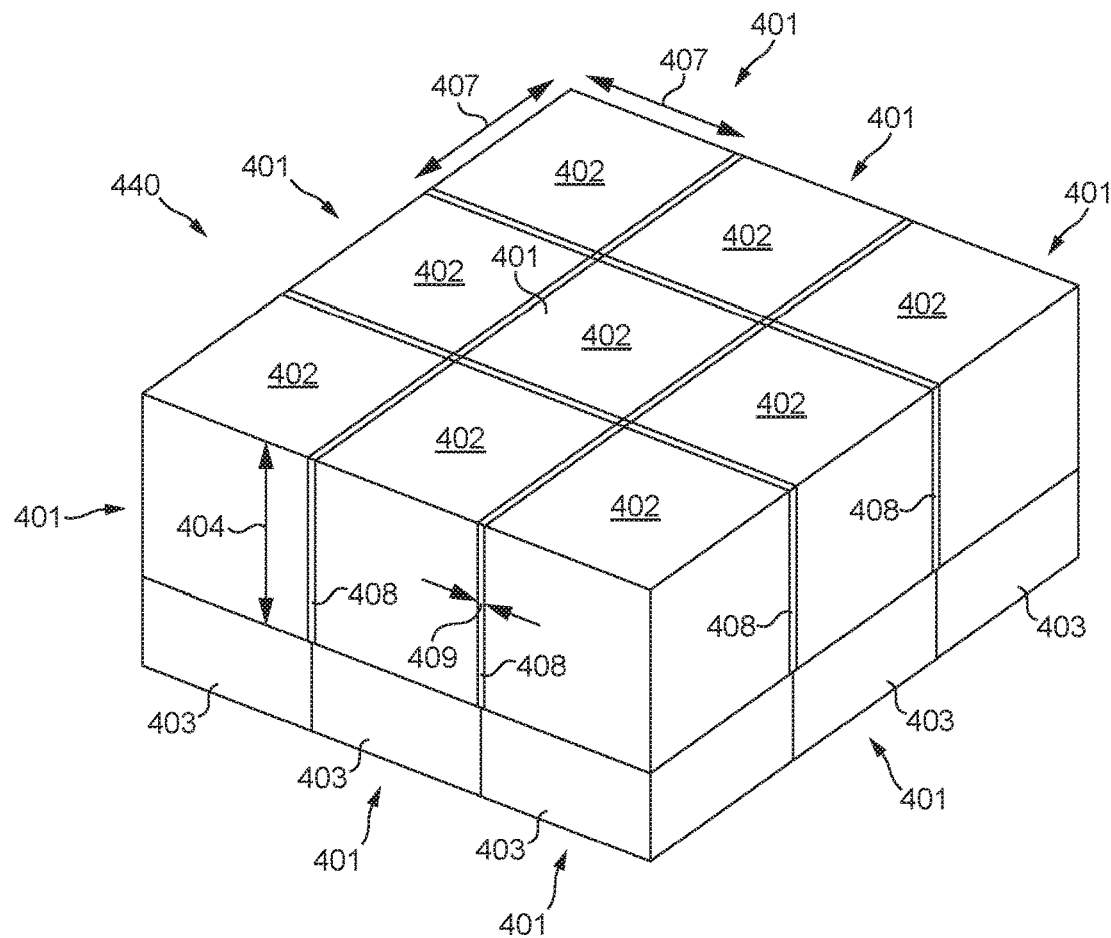
FIG. 10 is a schematic representation of a two-dimensional detector array according to a sixth embodiment of the invention.

In FIG. 10 a two-dimensional pixelated detector array 440 is formed from nine detectors 401. Each detector 401 has a BGO scintillator crystal 402 mounted on a silicon photomultiplier 403. The scintillator crystals 402 have a depth 404 of 4 mm. The pixel size 407 is 0.5 mm. Between the scintillator crystals 402 there is a thin layer of aluminium foil 408 having a thickness 409 of 50 microns. The aluminium foil 408 serves to reflect light exiting the sides of the scintillator crystals 402 back into the crystals and hence on to the photomultipliers 403, thus improving the signal strength.

Figure 11:
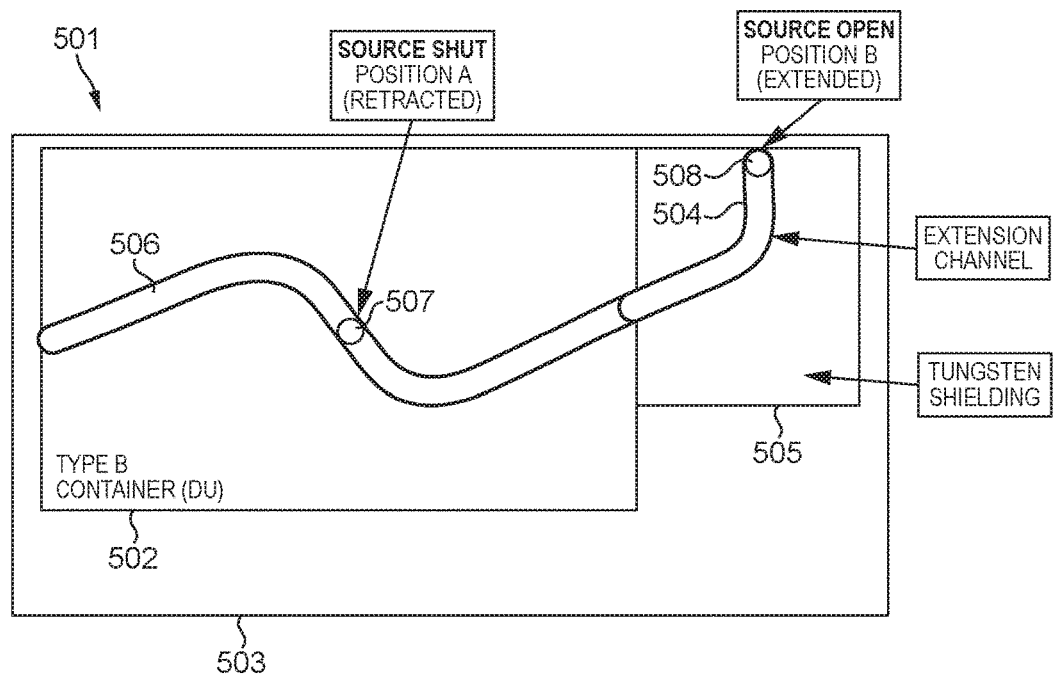
FIG. 11 is a source container according to a seventh embodiment of the invention.

In FIG. 11 a source container 501 has a Type B certified container 502 located within a pressure housing 503. Also within the pressure housing 503 is an extension channel 504 surrounded by shielding 505. The shielding 505 is formed of a shielding material which is attenuating to gamma radiation. In some embodiments a dense shielding material such as lead, tungsten, or a heavy alloy may be used, which is highly attenuating to gamma radiation. Alternatively, a less dense material such as steel may be used. This provides less shielding but is not as heavy as the denser shielding materials. In this embodiment tungsten is used. The Type B certified container 502 includes a channel 506. A source, in this embodiment a $^{192}$Ir source, can be stored in a stored position 507 inside the channel 506. In this embodiment the Type B certified container is a Sentinel 880 Delta container. The source can be moved, in this embodiment using a winding mechanism operated by an ROV, out of the channel 506 and into an operation position 508 in the extension channel 504. In the operation position 508 the source is exposed and produces a beam of radiation, the shape of which is determined by the shielding 505. The pressure housing 503 provides waterproof protection for the Type B container 502 and the extension channel 504 down to depth of at least 3000 m. Thus the Type B certified container 502 provides certified safety for transport of the source and the pressure housing 503 maintains that safety at subsea locations.

Figure 12A:
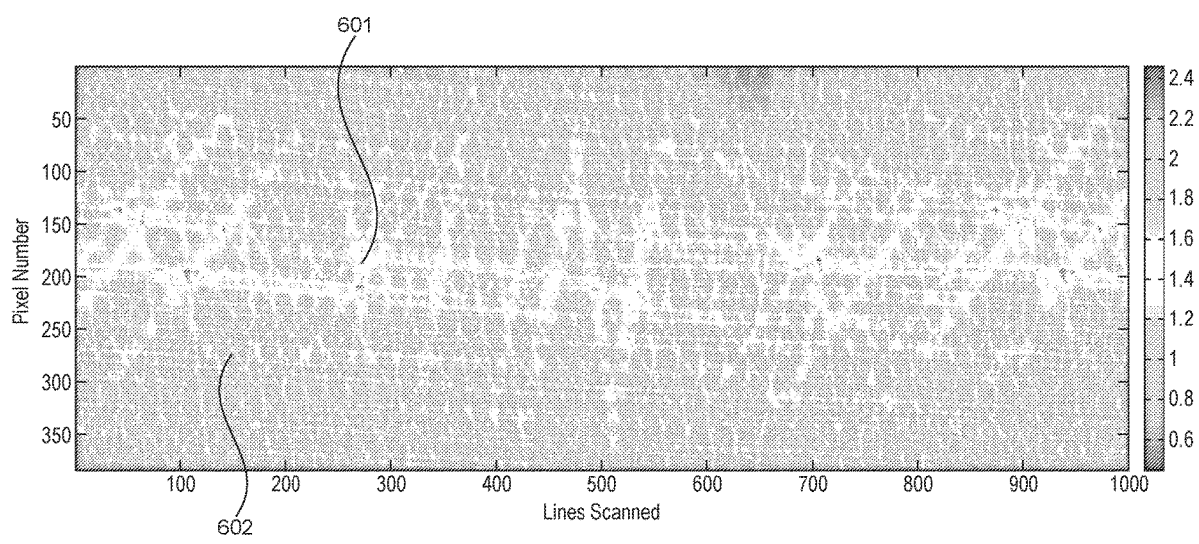
FIG. 12 is a comparison between a scan without a collimator (FIG. 12a) and a scan with a slit collimator (FIG. 12b)
Figure 12B:
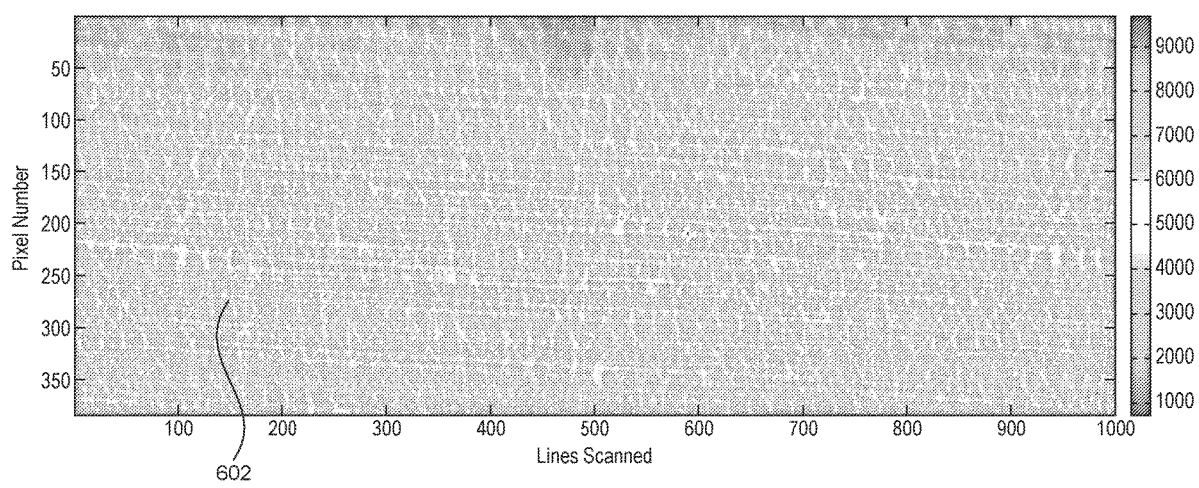

In FIG. 12 the addition of the collimator (FIG. 12b) reduces the overall count level in the image because it is preventing scattered counts from hitting the detector. However, the scattered counts may not be of interest in the radiographic image and may therefore be detrimental to image quality. Comparing FIG. 12a, in which there is no collimation, with FIG. 12b, in which there is a slit collimator of depth 30 mm, it can be seen that the addition of the collimator produces a significant improvement in the clarity and contrast of the image. The areas of noise 601 in FIG. 12a are reduced in FIG. 12b, while the features, which show in the Figures as diagonal lines 602, remain in FIG. 12b.

Figure 13:
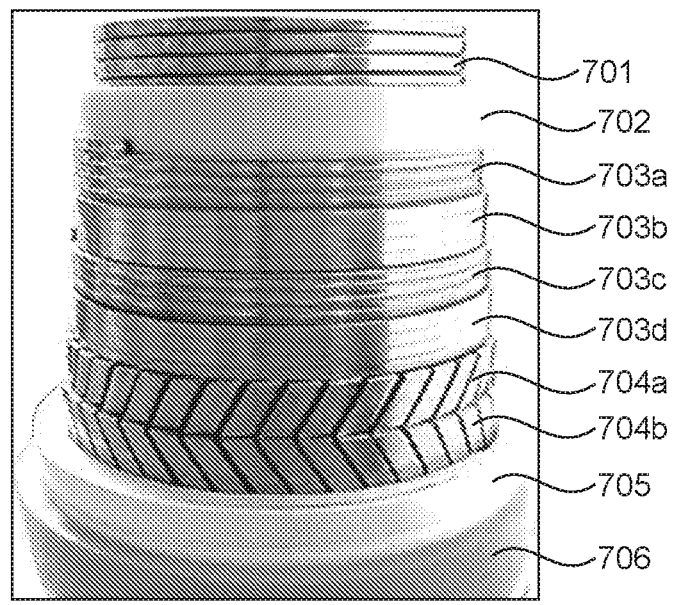
FIG. 13 is a view of a typical riser.

In FIG. 13 a typical flexible riser comprises a carcass 701, surrounded by a pressure sheath 702. The pressure sheath 702 is contained within pressure armour layers 703a, 703b, 703c, 703d, which in turn are within tensile armour layers 704a, 704b. The pressure armour layers 703a, 703b, 703c, 703d are formed from single strands wrapped around the riser, while the tensile armour layers 704a, 704b are formed from multiple strands wrapped diagonally around so as to provide tensile protection. Surrounding the armour layers there is an insulation layer 705 and finally an outer sheath 706. The method of the invention may advantageously detect failures in any of the layers in a single scan. In particular, the method of the invention may involve performing a scan and then analysing the data by a series of methods to detect failure modes in the different layers.

Figure 14A:
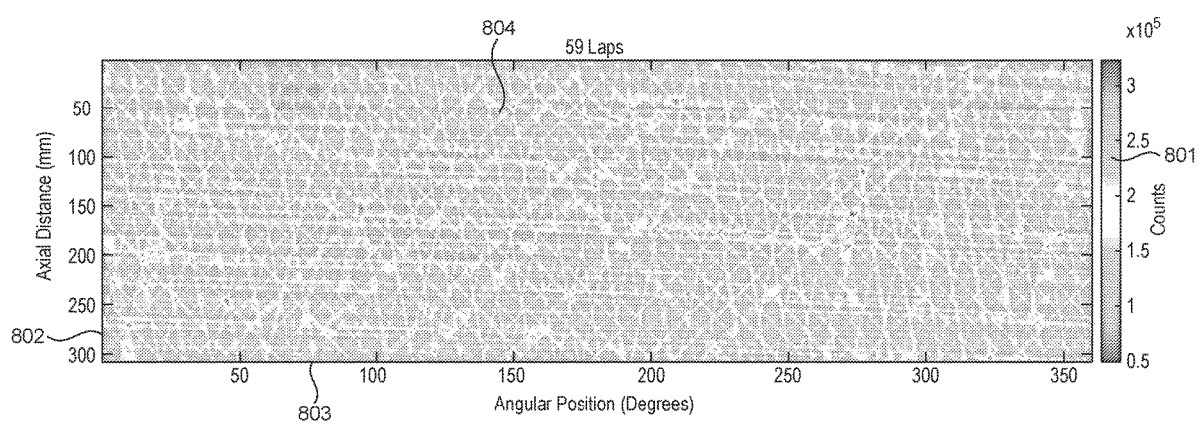
FIG. 14 is scan results and their Fourier transform.
Figure 15A:
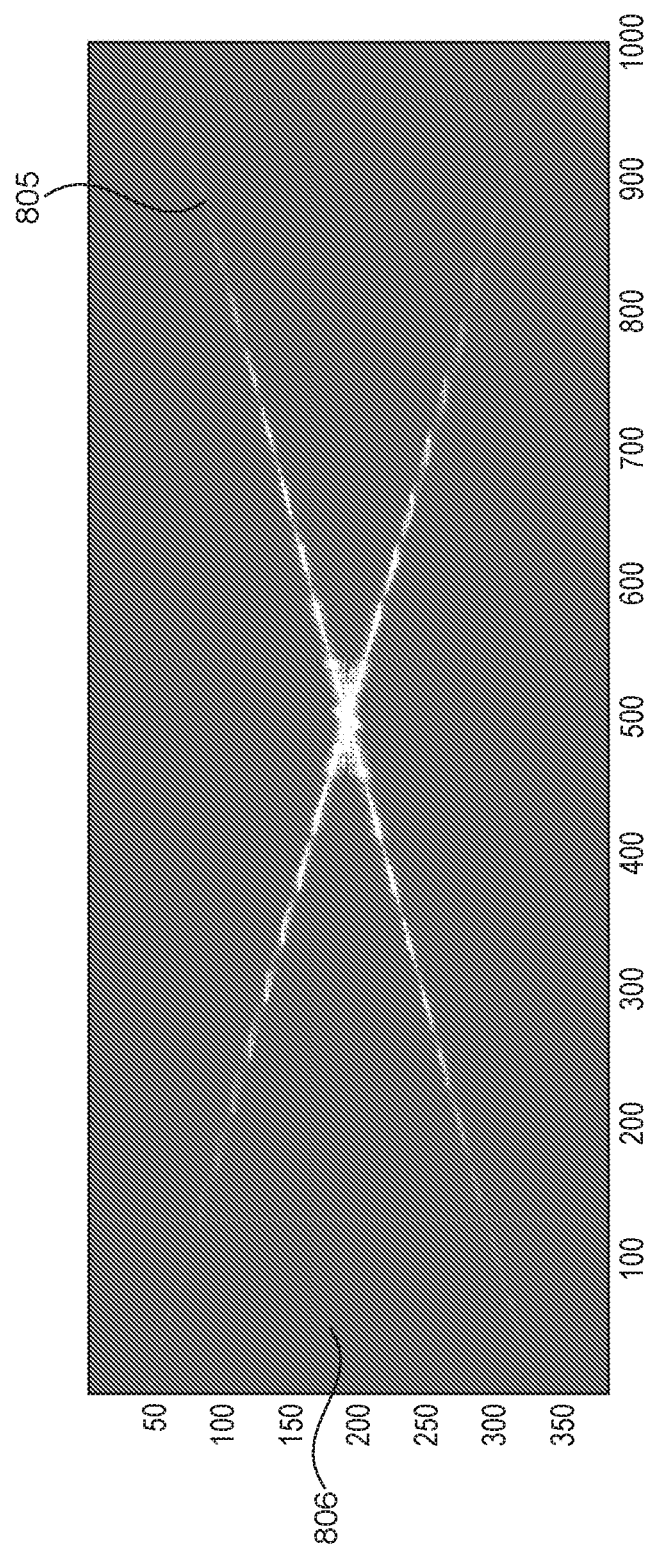
FIG. 15 is filtered transformed results and the resulting filtered scan results following reverse transformation.
Figure 15B:
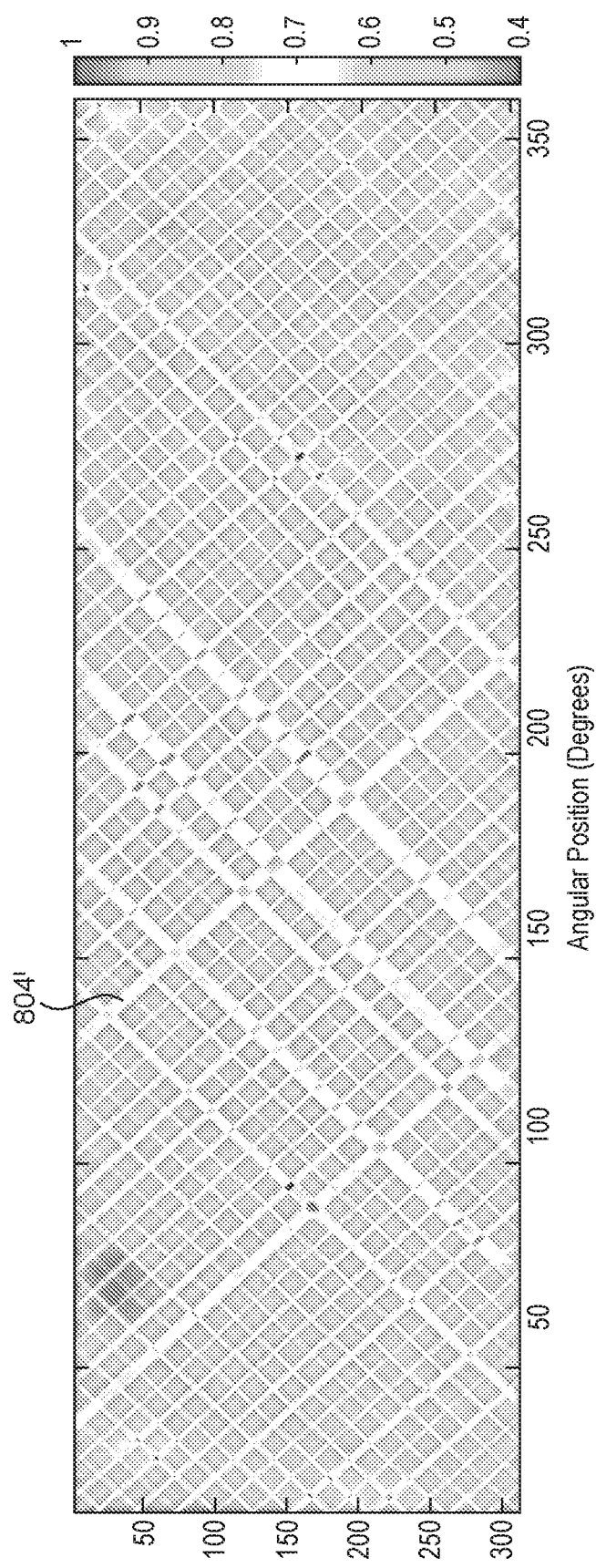
Figure 16:
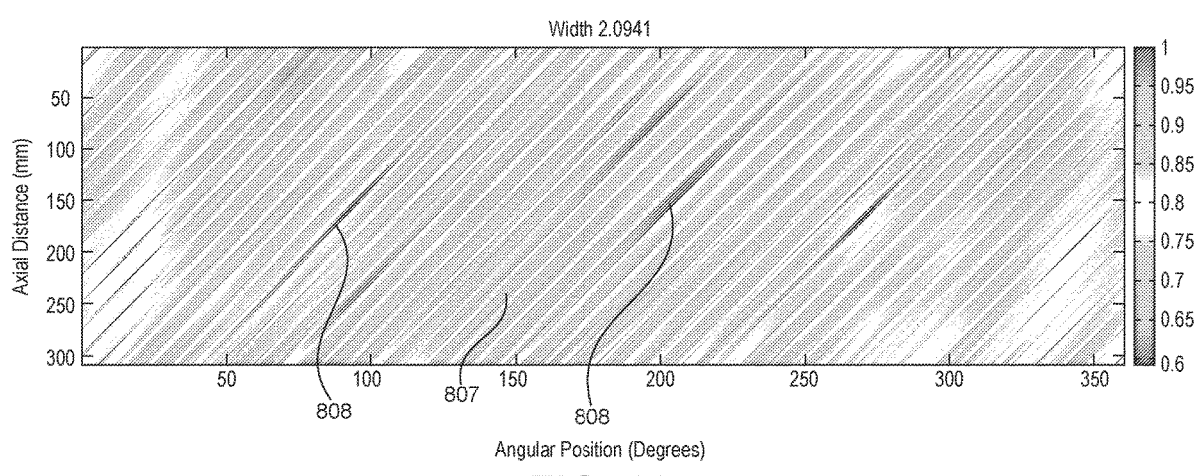
FIG. 16 is filtered scan results showing armour slippage.

In FIG. 14, scan results (FIG. 14A) and the Fourier transform of those scan results (FIG. 14B) are compared. In the scan results, the radiation counts 801 received by each detector are plotted by axial position 802 of the detector and angular position 803 of the detector. The result is a colour map of counts across axial and angular positions covered by the scan. The strands of the armour appear as diagonal lines 804 in the scan results. The quality of the scan results can be improved by filtering based on orientation so as to concentrate on those diagonal lines. In the Fourier transform of the results, features having a particular orientation in the scan results appear on distinctive lines 805 across the Fourier transform. Turning to FIG. 15A, a filter mask 806 can be created to select only some of those lines 805. The effect of doing that is to select, for example, only contributions from one side of the pipe. In the example here, the contribution from source-side features is reduced leaving only contributions from strands of armour on the side of the pipe nearest the detector. While the results could be filtered so as to instead enhance source-side features, it will be appreciated that detector-side features will tend to be better resolved because of the spreading of the radiation beam as it travels from the source to the detectors. When the resulting filtered Fourier transformed scan results are inverse transformed to produce filtered scan results (FIG. 15B) the features on the selected orientations are enhanced compared to those features on other orientations. Thus the scan results 804' relating to the armour strands of interest can be more clearly seen in the filtered scan results. In FIG. 15A an x-shaped mask is employed, which selects the two orientations seen in FIG. 15B. Those two orientations match the portion of the strands of two armour layers on the side of the pipe nearest the detector. A single arm of the "x" could instead be used to focus the results only on the contribution from one of the armour layers. That is demonstrated in FIG. 16, where a single arm of the mask has been used so as to isolate the contribution from the strands of one of the armour layers on the side of the pipe nearest the detector. The strands appear as diagonal lines 807, with slippage in the strands appearing as dark patches 808 between the diagonal lines.

Figure 17:
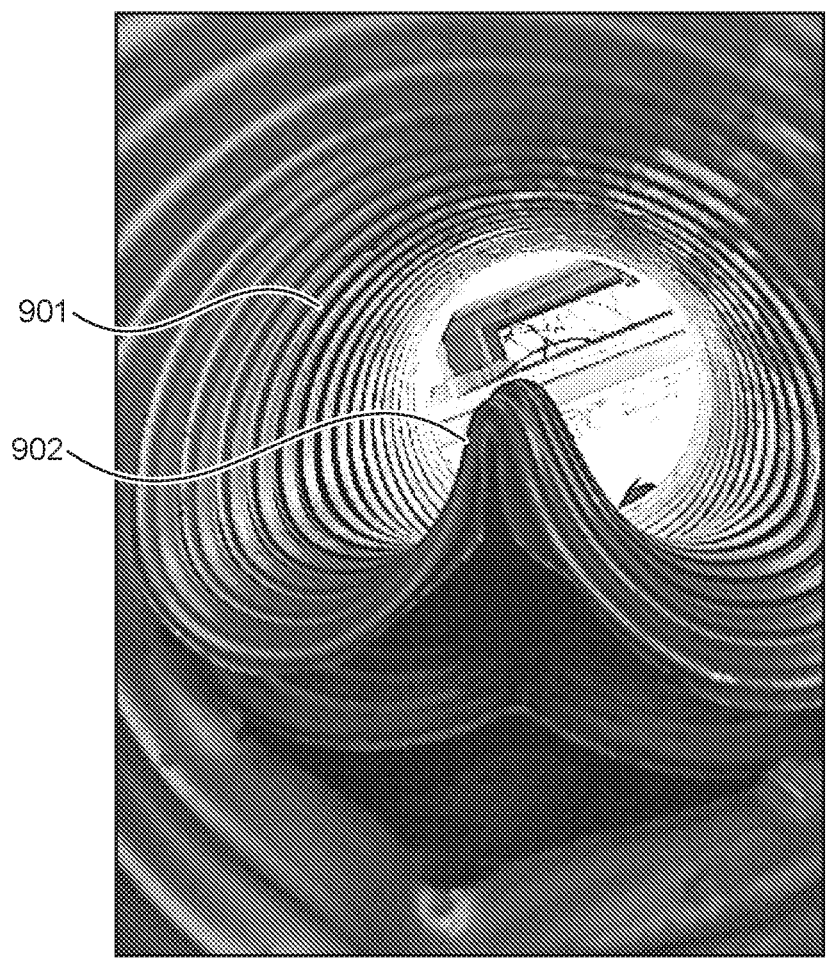
FIG. 17 is a view of a collapsed carcass.
Figure 18:
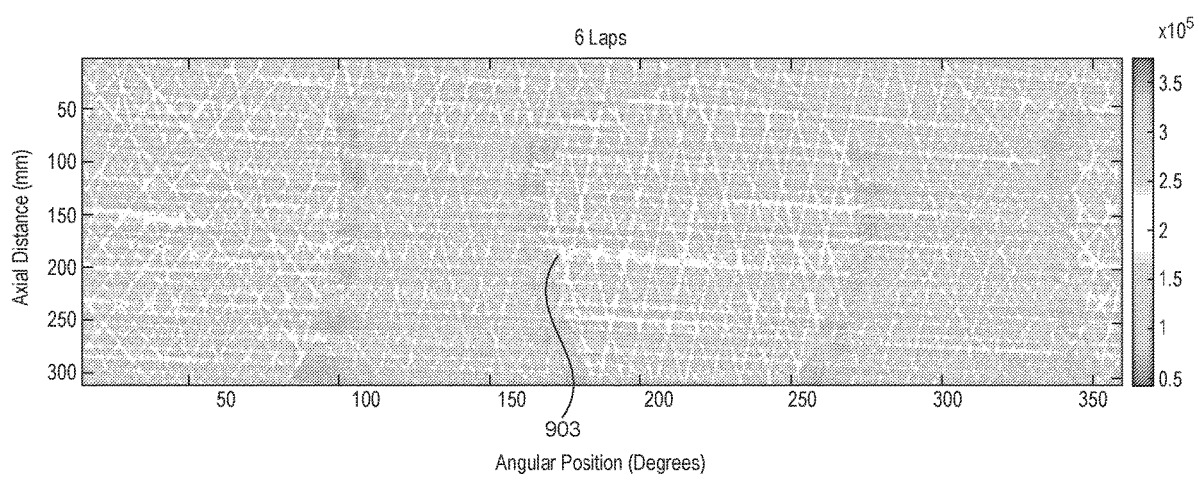
FIG. 18 is the corresponding scan results for the collapsed carcass of FIG. 17.

In FIG. 17 an example of carcass collapse 902 involves the inner layers of the flexible riser 901 collapsing inwards into the centre of the riser 901. The collapse 902 is clearly a failure mode that it is desirable to detect since it can lead to flow obstructions and further damage to the riser through fluid leakage into the riser layers. In FIG. 18, it can be seen that the carcass collapse 902 result in a distinctive pattern 903 in the scan results. Thus the method may identify carcass collapses by identifying the distinctive pattern 903 in the scan results.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A method for scanning a subsea structure, the method comprising:
   positioning the subsea structure between a source of gamma radiation and a plurality of detectors arranged to detect gamma radiation emitted by the source;
   rotating the detectors and the source in a fixed relationship to each other about an axis of rotation located between the detectors and the source; and,
   scanning the subsea structure to detect differences in density between different parts of the subsea structure, wherein the plurality of detectors are arranged in a linear array, the linear array being substantially parallel to the axis of rotation
   wherein the method comprises rotating the detectors and the source about the axis of rotation through an angle of 360 degrees or more, and
   wherein the method comprises comparing the data from two scan positions separated by 180 degrees and inferring from the comparison the angular location of a defect.

2. The method according to claim 1, wherein the method comprises recording data related to the count rate of gamma radiation detected by each detector at each of a plurality of angular positions during the rotation of the detectors and the source in the fixed relationship to each other about the axis of rotation located between the detectors and the source.

3. The method according to claim 2, wherein the method comprises analysing the data to detect differences in density between different parts of the subsea structure.

4. The method according to claim 1, wherein the method comprises continuously recording count rates for each of the detectors as the source and detectors rotate about the axis of rotation and assigning the count rate recorded over a small segment of angular rotation to an angular position characteristic of that segment.

5. The method according to claim 1, wherein the method comprises obtaining scan results, performing a Fourier transform of the scan results to create transformed results, filtering the transformed results to selectively emphasise features of the scan results and reverse Fourier transforming the filtered transformed results to create filtered scan results.

6. The method according to claim 5, wherein the subsea structure is a flexible riser and the method comprises detecting a failure mode in the flexible riser.

7. A method for scanning a subsea structure, the method comprising:
   positioning the subsea structure between a source of gamma radiation and a plurality of detectors arranged to detect gamma radiation emitted by the source;
   rotating the detectors and the source in a fixed relationship to each other about an axis of rotation located between the detectors and the source; and,
   scanning the subsea structure to detect differences in density between different parts of the subsea structure, wherein the plurality of detectors are arranged in a linear array, the linear array being substantially parallel to the axis of rotation,
   wherein the method further comprises
   positioning a part of the structure identified as having a potential defect in the analysis of the data between a second source of gamma radiation and a second plurality of detectors arranged to detect gamma radiation emitted by the second source; and
   rotating the second detectors and the second source in a fixed relationship to each other about an axis of rotation located between the second detectors and the second source;
   wherein the second plurality of detectors are arranged in an arcuate array, the arcuate array being in a plane perpendicular to the axis of rotation.

8. The method according to claim 7, wherein the second source and the second plurality of detectors are provided at a location of a defect identified in a first scan performed using the source and the linear array of detectors.

9. A subsea apparatus for scanning a subsea structure, the apparatus comprising:
   a source of gamma radiation; and
   a plurality of detectors arranged to detect gamma radiation emitted by the source;
   wherein the source and the detectors are arranged for rotation in a fixed relationship with respect to each other, about an axis of rotation located between the source and the detectors;
   wherein the subsea apparatus is configured to scan the subsea structure to detect differences in density between different parts of the subsea structure when the subsea structure is positioned between the source and the detectors and the source and detectors are rotated about the axis of rotation; and, wherein the plurality of detectors are arranged in a linear array, the linear array being substantially parallel to the axis of rotation, wherein the apparatus further comprises a source container comprising:

a Type B certified container having a channel for containing the source; and an extension channel, the extension channel being connectable to the channel such that the source can be moved from a stored position in the channel to an operation position in the extension channel;

wherein the extension channel comprises shielding such that, when the source is in the operation position, radiation from the source is emitted in a pattern determined by the shielding;

wherein the certified container and the extension channel are contained within a watertight pressure vessel.

10. The subsea apparatus according to claim 9, wherein the linear array of detectors comprises an array of scintillators and an array of photodetectors optically coupled to the scintillators in order to detect and measure light generated by the scintillators in response to photons of radiation from the source.

11. The subsea apparatus according to claim 10, wherein the photodetectors are silicon photomultipliers.

12. The subsea apparatus according to claim 10, wherein the scintillators are BGO or CWO scintillators.

13. The subsea apparatus according to claim 10, wherein the scintillators have a depth of not less than 1 mm.

14. The subsea apparatus according to claim 10, wherein the scintillators are separated by a layer of optically reflective material.

15. The subsea apparatus according to claim 14, wherein the layer has a thickness of less than 50 microns.

16. The subsea apparatus according to claim 9, wherein the apparatus comprises a collimator comprising a slit that runs parallel to the axis of rotation and along in front of detection surfaces of the detectors arranged in the linear array.

17. The subsea apparatus according to claim 9, wherein the source is $^{192}$Ir.

18. The subsea apparatus according to claim 9, wherein the apparatus is provided with crawler apparatus for moving along the subsea structure.

* * * * *